(12) United States Patent
Ma et al.

(10) Patent No.: US 7,993,738 B2
(45) Date of Patent: Aug. 9, 2011

(54) MODIFIED POROUS MATERIALS AND METHOD OF FORMING THE SAME

(75) Inventors: Peter X. Ma, Ann Arobor, MI (US); Xiaohua Liu, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 489 days.

(21) Appl. No.: 12/020,488

(22) Filed: Jan. 25, 2008

(65) Prior Publication Data
US 2008/0213564 A1 Sep. 4, 2008

Related U.S. Application Data

(63) Continuation-in-part of application No. 10/999,459, filed on Nov. 30, 2004, now Pat. No. 7,323,208.

(51) Int. Cl.
*B32B 3/26* (2006.01)
*B29C 44/04* (2006.01)
*C08J 9/36* (2006.01)
*B05D 5/00* (2006.01)

(52) U.S. Cl. ............ 428/304.4; 428/307.7; 428/311.71; 428/314.2; 428/315.5; 428/315.7; 428/317.9; 428/319.1; 264/48; 264/45.1; 427/2.24; 427/2.25; 427/2.27; 427/2.31; 521/50; 521/52; 521/53

(58) Field of Classification Search ........................ None
See application file for complete search history.

(56) References Cited

U.S. PATENT DOCUMENTS

| | | | | |
|---|---|---|---|---|
| 4,863,475 A * | 9/1989 | Andersen et al. | ............ | 128/898 |
| 4,925,924 A * | 5/1990 | Silver et al. | .................... | 530/356 |
| 5,399,361 A * | 3/1995 | Song et al. | .................... | 424/486 |
| 6,051,425 A * | 4/2000 | Morota et al. | ................. | 435/325 |
| 6,146,892 A | 11/2000 | Ma et al. | | |
| 6,673,285 B2 | 1/2004 | Ma | | |
| 2003/0113359 A1 * | 6/2003 | Iyer et al. | ...................... | 424/423 |

FOREIGN PATENT DOCUMENTS

| | | |
|---|---|---|
| CN | 1389481 | 1/2003 |
| JP | 2182259 | 7/1990 |
| WO | WO-01/80921 | * 11/2001 |

OTHER PUBLICATIONS

Ma, P. et al. "Biodegradable Polymer Scaffolds with Well-Defined Interconnected Spherical Pore Network", Tissue Engineering 2001; 7(1), pp. 23-33.
Ma, P. et al. "Synthetic Nano-Scale Fibrous Extracellular Matrix" J Biomed Mater Res 1999; 46(1), pp. 60-72.
Zhang, R. et al "Synthetic Nano-Fibrillar Extracellular Matrices with Predesigned Macroporous Architectures", J Biomed Mater Res 2000; 52(2), pp. 430-438.
International Search Report for S.N. PCT/US2004/040011 dated Jan. 19, 2006 (15 pages).

* cited by examiner

*Primary Examiner* — Ling Xu
(74) *Attorney, Agent, or Firm* — Dierker & Associates, P.C.

(57) ABSTRACT

Modified porous materials are disclosed having interconnected, complexly shaped three-dimensional surfaces. The modification is accomplished by crosslinking the three-dimensional surfaces or by incorporating, in situ, an inorganic material onto or into three-dimensional surfaces. The porous materials are macro structures including at least one of nano-features, micro-features, and combinations thereof. The modifying accomplishes changing surface properties of the porous materials, changing the three-dimensional surfaces, and/or rendering the porous materials substantially stable in a predetermined environment.

36 Claims, 18 Drawing Sheets

US 7,993,738 B2

MODIFIED POROUS MATERIALS AND METHOD OF FORMING THE SAME

CROSS-REFERENCE TO RELATED APPLICATION

This application is a continuation-in-part and a divisional application of U.S. patent application Ser. No. 10/999,459 filed Nov. 30, 2004, now U.S. Pat. No. 7,323,208, incorporated herein by reference in its entirety.

STATEMENT REGARDING FEDERALLY SPONSORED RESEARCH OR DEVELOPMENT

This invention was made in the course of research partially supported by grants from the National Institutes of Health, Grant Numbers DE014755, DE015384, DE017689 and GM075840. The U.S. government has certain rights in the invention.

REFERENCE TO A SEQUENCE LISTING

A sequence listing pursuant to 37 CFR §1.821 is submitted herewith.

BACKGROUND

The present disclosure relates generally to porous materials, and more particularly to modified porous materials and method(s) of forming the same.

Porous materials are widely used in biomedical, industrial, and household applications. In the biomedical field, porous materials have been used as scaffolds (templates) for tissue engineering/regeneration, wound dressings, drug release matrices, membranes for separations and filtration, sterile filters, artificial kidneys, absorbents, hemostatic devices, and the like. In various industrial and household applications, porous materials have been used as insulating materials, packaging materials, impact absorbers, liquid or gas absorbents, membranes, filters and so forth.

However, many porous materials may be useful in only certain limited environments. For example, porous polymer materials may be used as scaffolds for cell incorporation, proliferation and tissue regeneration in aqueous environments (such as in a tissue culture medium, in a bioreactor, or implanted inside a human or animal body). Yet, such a polymer often cannot be used for other applications that involve the use of certain organic solvents that dissolve or significantly change the physical form and properties of the polymer. Similarly, a porous material made of a water-soluble polymer, natural macromolecule, or inorganic compound may work well in air, an organic solvent, or certain solutions; yet, it may not maintain its structure and function in an aqueous environment because it dissolves or seriously deforms in water or aqueous solutions. Many porous metallic materials (pure metals or alloys) may also deleteriously dissolve in, rust in, or react with certain aqueous or organic solvents, which may lead to a variety of problems.

Thus, it would be desirable to provide porous materials which may be used in varied predetermined environments.

SUMMARY

Modified porous materials are disclosed having interconnected, complexly shaped three-dimensional surfaces. The modification is accomplished by crosslinking the three-dimensional surfaces and/or by incorporating, in situ, an inorganic material onto or into the three-dimensional surfaces. The porous materials are macro structures including at least one of nano-features, micro-features, and combinations thereof. The modifying accomplishes changing surface properties of the porous materials, changing the three-dimensional surfaces, and/or rendering the porous materials substantially stable in a predetermined environment.

BRIEF DESCRIPTION OF THE DRAWINGS

Features and advantages will become apparent by reference to the following detailed description and drawings, in which:

FIG. 14A illustrates the size variation of scaffolds (nano-fibrous gelatin and GELFOAM®) prior to culturing (labeled "Virgin") and after culturing MC3T3-E1 osteoblasts for 1 week, FIG. 14B is a microscopic observation of an H&E stained GELFOAM® after culturing MC3T3-E1 osteoblasts for 2 weeks, (4× magnification), FIG. 14C is a microscopic observation of an H&E stained nano-fibrous gelatin scaffold after culturing MC3T3-E1 osteoblasts for 2 weeks (4× magnification)

FIGS. 15A through 15C depict SEM micrographs of a nano-fibrous gelatin/apatite scaffold formed by immersing a nano-fibrous gelatin scaffold in 1.5×SBF for 7 days, wherein FIG. 15A depicts the nano-fibrous gelatin/apatite scaffold at 250× magnification, FIG. 15B depicts a pore-wall structure of the nano-fibrous gelatin scaffold at 4000× magnification, and the pore-wall structure of the nano-fibrous gelatin scaffold at 10,000× magnification;

DETAILED DESCRIPTION

Figure 1:
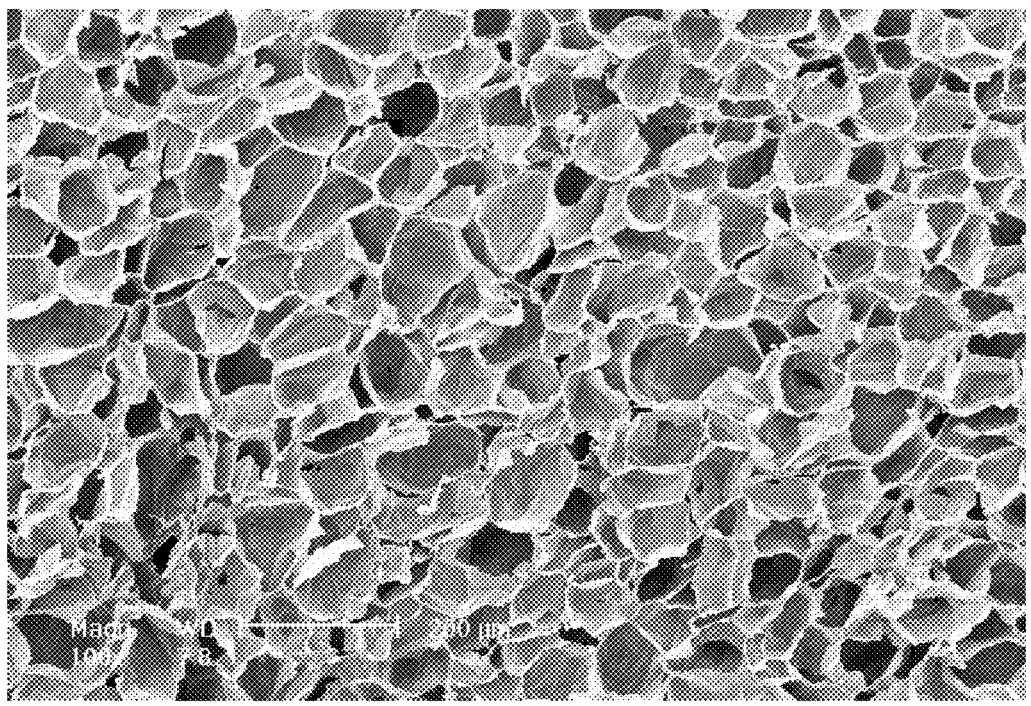
FIG. 1 is a SEM micrograph of a porous material formed from a 2% gelatin solution in water, dissolved at 50° C. and gelled at −76° C.

Scaffolds for tissue engineering are often designed to serve as a temporary, artificial extracellular matrix (ECM) in order to support cell attachment and guide three-dimensional (3D) tissue formation. As such, it is desirable for the scaffold to mimic the advantageous characteristics of the natural ECM. Embodiments of the porous materials disclosed herein include scaffolds with interconnected spherical macro pores, which mimic both the nano-scale physical architecture and chemical composition of natural collagen matrices.

It has been unexpectedly and fortuitously discovered that porous materials having interconnected, complexly shaped three-dimensional surfaces may be advantageously modified so as to stabilize the porous materials in a predetermined environment, to modify the surfaces thereof, to change the surface (physical) properties, and/or to change the biological properties. It is to be understood that the complexly shaped surfaces may be any suitable shape, as long as the pores are interconnected. Some suitable non-limitative examples of 3-D pores forming the surfaces include spherical, cubical, square, channels (any shape, such as cylindrical channels, for example), and any other suitable geometries, including regular and/or non-regular.

The porous materials may be modified/stabilized by crosslinking the three-dimensional surfaces, by coating the three-dimensional surfaces with a layer or particles of a predetermined material, and/or by incorporating a predetermined material into the porous material. In some instances, the porous materials are modified by depositing an inorganic material onto the three-dimensional surfaces or by incorporating an inorganic material into the three-dimensional surfaces. Non-limiting examples of such inorganic materials include hydroxyapatite (HAP) (e.g., partially carbonated HAP), calcium carbonate, calcium phosphate, beta-TCP, bioglass, calcium sulfate, oxides, other inorganic/ceramic compounds, or combinations thereof. It is believed that HAP and other inorganic materials enhance osteoblastic differentiation, proliferation, cell adhesion, mechanical properties of the scaffold, and bone bonding ability, and thus may be particularly suitable for bone tissue engineering.

If a coating is used, the coating may optionally be crosslinked, if desired for a particular end use. It is to be understood that the crosslinking may be achieved via covalent bond formation and/or ionic bond formation.

In an embodiment, the porous materials are macro structures including nano-features (e.g., nano-fibers), micro-features (e.g., micro-fibers, micro-pores), and/or combinations thereof. It is to be understood that, as defined herein, nano-features are intended to include features ranging in size between about $10^{-10}$ meters and about $10^{-6}$ meters; and micro-features are intended to include features ranging in size between about $10^{-6}$ meters and about $10^{-3}$ meters. The macro structures generally include interconnected macro pores. Such macro pores have a size (e.g., diameter) ranging from about $10^{-3}$ meters to about $10^{-1}$ meters.

The modifying/stabilizing may be accomplished by crosslinking. Further, it is to be understood that the crosslinking density may be varied in a manner sufficient to achieve predetermined physical and/or biological properties. Some non-limiting examples of physical properties include, but are not limited to mechanical properties, swelling properties, and/or surface properties (e.g., hydrophilicity/hydrophobicity). A non-limitative example of a biological property is cell interaction with the porous materials.

It is to be understood that if the porous materials are coated, they may be coated with one or more layers. It is to be further understood that if there is more than one layer, the layers may completely or substantially completely overlie one another, or they may partially contact one another. Yet further, it is to be understood that each individual coating layer may range in thickness between about $10^{-10}$ meters and about $10^{-3}$ meters. In an embodiment, each coating layer may range in thickness between about $10^{-9}$ meters and about $10^{-6}$ meters.

Still further, the porous materials may be modified with an inorganic material that is coated on the surfaces of the porous material or is directly mixed in the polymer solution during the porous material fabrication. The inorganic material may be in the form of nano-sized particles, micro-sized particles, or larger particles. When the inorganic material is established on the surfaces of the porous materials, the number and size of the particles that are formed thereon depend, at least in part, on the incubation time and the ionic concentration of the simulated body fluid used. Generally, the average particle number and size increases with incubation time. Furthermore, it is believed that the compressive modulus may also increase with incubation time.

The porous materials in any of the embodiments disclosed herein may be formed from at least one of synthetic macromolecules; natural macromolecules; substantially non-macromolecular materials; natural macromolecule-containing materials; synthetic macromolecule-containing materials; oligomeric materials; fragments of macromolecules; macromolecule-containing composites; and mixtures thereof.

It is to be understood that, as defined herein, "macromolecule" is intended to include large molecules without repeating units, polymeric materials (i.e. large molecules with repeating units), co-polymers, and combinations thereof. Further, various non-limitative examples of some specific macromolecules, polymers, and monomers useful for forming polymers are given hereinbelow.

In an embodiment, the natural macromolecules are proteins, carbohydrates, lipids, derivatives thereof, denatured forms thereof, modified forms thereof, fragments thereof, and/or mixtures thereof. Some non-limitative examples of derivatives, modified forms and/or denatured forms include gelatin (a denatured protein that is a derivative of collagen). Gelatin may be particularly suitable for the porous materials (e.g., when the porous material is a scaffold) in part because gelatin is a denatured biopolymer derived from collagen by acidic or basic hydrolysis. It is believed that gelatin circumvents risks of immunogenicity and pathogen transmission often associated with acellular bone matrix collagen, while providing similar advantageous biological properties.

Examples of suitable cell interactive materials which may be used as the porous materials and/or as coating materials include, but are not limited to fibronectin; vitronectin, other members of the pexin family, laminin, hyaluronate, chitosan, alginates, polypeptides, peptides (for example, RGD peptides), and/or the like.

It is to be understood that macromolecule-containing composites have macromolecules as a major component thereof. Other components may include ceramic materials, metal materials, small molecules, inert additives, active additives, and/or mixtures thereof. Some non-limitative examples of additives include pigments, surfactants, adhesion enhancers, predetermined ingredient-releasing enhancers, bioactive agents (for example, growth factors and hormones).

The substantially non-macromolecular materials may be ceramic materials, metallic materials, and/or mixtures thereof. It is to be understood that the ceramic materials in the composites and/or in the non-macromolecular materials may be any suitable ceramic materials. Some non-limitative examples of suitable ceramic materials include alpha- or beta-TCP (tri calcium phosphate), hydroxyapatite (HAP); carbonated HAP; bioglasses; oxides; and/or combinations thereof.

It is to be understood that the metal materials in the composites and/or in the non-macromolecular materials may be any suitable metal materials. Some non-limitative examples of suitable metal materials include stainless steel, titanium, base alloys such as chromium alloys, cobalt alloys, titanium alloys, gold, noble alloys, and/or the like, and/or mixtures thereof.

It is to be understood that porous materials may be made of synthetic polymers, natural macromolecules, inorganic compounds, ceramic or metallic materials. These porous materials can be made using many different fabrication technologies, including sintering, stretching, extrusion, self-assembly, phase inversion, phase separation, porogen-leaching, gas-foaming, etching, casting, and solid free form fabrication techniques (computer-assisted design and computer-assisted manufacture, i.e., CAD-CAM. See, for example, the inventor's recent publications in this regard: Ma, P. X. (2004), "Scaffolds for tissue fabrication," *Materials Today* 7, 30-40; and Ma, P. X. (2004), "Tissue Engineering," In *Encyclopedia of Polymer Science and Technology*, Kroschwitz, J. I., ed. (Hoboken, N J, John Wiley & Sons, Inc.)

The porous materials may also be formed from biodegradable materials suitable for tissue regeneration. Some non-limitative examples of such biodegradable materials include poly(L-lactic acid) (PLLA), polyglycolic acid (PGA), poly(lactide-co-glycolide) (PLGA), and/or mixtures thereof.

In some instances, the porous materials are scaffolds formed via thermally induced phase separation and porogen leaching techniques. It is believed that such techniques may be particularly suitable for forming nano-fibrous gelatin scaffolds having a well-defined three-dimensional porous network including macropores.

In a non-limiting example of the thermally induced phase separation and porogen leaching techniques, a water and ethanol solvent mixture is used to dissolve gelatin. It has been found that the addition of ethanol or methanol to the aqueous gelatin solution enhances the formation of the nano-fibrous structure. A desirable nano-fibrous structure generally results when the ethanol/water or methanol/water ratio in gelatin solution ranges from about 10/90 (v/v) to about 60/40 (v/v), or from about 20/80 (v/v) to about 50/50 (v/v). The fiber diameter of such a structure ranges from about 50 nm to about 500 nm with the average fiber diameter being about 150 nm (which is similar to that of natural collagen fibers). Furthermore, the fiber diameter does not significantly change with alterations in gelatin concentration.

The aqueous gelatin solution may be established on (e.g., via a casting method) a porogen formed of, for example, paraffin spheres, and freeze-dried to induce phase separation. The porogen is then leached out in a suitable solvent, leaving behind the three-dimensional porous material (such as a scaffold).

In embodiments in which the inorganic material is incorporated into the porous material (such as a scaffold), the previously described thermally induced phase separation and porogen leaching techniques may be used. In such embodiments, the inorganic material is mixed with the gelatin solution prior to being cast onto the porogen. This results in the formation of a gelatin/inorganic porous composite material or scaffold (i.e., inorganic material incorporated into the porous material or scaffold), rather than the inorganic material established on the surface of the gelatin scaffold.

In any of the embodiments including porogen leaching, the timing of the dissolution of the porogen may be decreased by carrying out the process in an oven at a temperature higher than room temperature (a non-limiting example of which is about 37° C.).

It is believed that such techniques enable control over the design and fabrication of the porosity, pore size, and interconnectivity of the resulting scaffold. For example, as the porogen is used to form the scaffold, the pore size is dependent upon, at least in part, the size of spheres used. Further, during formation of the porogen, it is believed that the heat treatment of the spheres may be varied to change the interpore connectivity (e.g., longer heat treatments allow for the formation of larger bonding areas and larger openings). In some instances, the porosity is as high as 98%, which is believed to improve the quality of the regenerated tissue through enhanced cell penetration, migration and biological function throughout the scaffold construct.

When the porous materials are coated, it is to be understood that the coating may be accomplished by any suitable means, including but not limited to mechanical application, thermal application, adhering, self-assembling, molecular entrapment, chemical bonding, and/or combinations thereof. Non-limitative methods of coating are discussed further hereinbelow. Further, it is to be understood that when a coating is used, the coating may be formed from the same, a similar, or different material from that of the porous materials.

It is to be understood that the coating may be formed of any suitable material (many examples are listed hereinbelow). In a non-limitative embodiment, the coating is formed from gelatin, vitronectin, fibronectin, laminin, peptides, polypeptides, chitosan, hyaluronate, alginates, and/or mixtures thereof.

As discussed above, the present disclosure concerns fabrication and methods of stabilizing/modifying nano-(size scale $10^{-9}$-$10^{-6}$ m) and/or micro-(size scale $10^{-6}$-$10^{-3}$ m) structures, as well as the macro-structures ($\geqq 10^{-3}$ m) of porous materials. Specifically, interconnected complex shaped 3D surfaces of the porous materials are crosslinked via chemical (either covalent or ionic) bond formation, are coated with a very thin layer(s) of a material(s) that is stable in the service environment to maintain the nano-/micro-features as well as the macro-structure, or have inorganic material(s) incorporated therein/thereon. The crosslinking density may also be tailored to achieve desired mechanical, swelling and/or other physical properties. At least four different embodiments are disclosed to achieve the stabilization/modification of such complex 3D surfaces.

One embodiment, as previously mentioned, is to "directly" crosslink the surfaces of a porous material, for example, if it is made of a synthetic polymer (including polymers of multiple types of monomers), a mixture of polymers, a polymer-containing composite, i.e., at least one of the components of the porous material is a polymer; a natural macromolecule (such as proteins, carbohydrates, lipids, their derivatives including denatured forms, modified forms, fragments, and any combinations of them), a mixture of macromolecules, and/or a macromolecule-containing composite, i.e., at least one of the components of the porous material is a naturally derived macromolecule.

As examples for the first type of systems ("directly crosslinking"), porous gelatin materials having nano-fibrous structure, or nano-fibrous structure with micro- to macro-level pores were fabricated. The nano-fibrous feature is maintained or substantially maintained along with the micro- or/and macro-porous structure by using crosslinking reagents in a suitable solvent (solvent mixture), which may allow certain level(s) of molecular motion and chemical reactions to occur.

A second embodiment is to coat the 3D complex-shaped surfaces of the interconnected porous materials with a composition containing at least one polymer or macromolecule if the coating itself is substantially stable under the service environment. If the coating itself is not substantially stable under the service environment, the coating composition may then be crosslinked (termed "indirect" crosslinking). Here, the initial porous materials may be polymer/macromolecule-free (such as ceramic or metallic structures), polymer/macromolecule-containing, substantially polymeric/macromolecular, or entirely polymeric/macromolecular materials.

In the above-described systems, the polymer/macromolecule may actually be a smaller molecule than a normal polymer or macromolecule, such as an oligomer or a fragment of a natural macromolecule. There also may be variations of the above-described systems. For example, the polymer can actually be synthesized in situ using monomers and other chemicals such as initiators and/or solvents, etc.

When coatings are used, they may be mechanically or thermally applied, physically adhered (via van der Waals, hydrogen-bond, and electrostatic interactions; mechanically entangled or restricted), self-assembled, molecularly entrapped (interpenetrated), and/or chemically bonded to the complex-shaped 3D surfaces of the porous materials. The coating formulation generally does not substantially dissolve or seriously deform the porous materials in an undesired way.

As examples for the second type of systems (stable coating or "indirect" crosslinking), PLLA nano-fibrous materials with or without designed micro- or/and macro-pores were used. These porous PLLA materials are coated with a composition (e.g., gelatin) different from the porous material (PLLA). If the coating itself is not stable under the service environment, the coating material is then crosslinked. These coated materials can protect the base materials from destruction or deformation under certain environments (e.g., in an organic solvent for PLLA). In some cases, these coating materials themselves or incorporated additives could have certain other functions (such as physical or biological functions, including improving cellular interactions and releasing drugs or biological factors).

A third embodiment is to incorporate inorganic material particles onto the 3D complex-shaped surfaces of the interconnected porous materials. A simulated body fluid (SBF) technique or other like deposition technique is used to deposit the inorganic material particles on the surfaces of the porous material. Such techniques generally include incubating the porous material (e.g., scaffold) in a simulated body fluid or some other liquid reagent(s) capable of depositing the inorganic material(s) for a predetermined time and at a predetermined temperature. The time and temperature may vary, depending, at least in part, on the number and size of particles that are to be deposited on the porous material. Non-limiting examples of suitable liquid reagents include calcium chloride or calcium phosphate solutions. Non-limiting examples of the simulated body fluids are described in Zhang et al., *Journal of Biomedical Material Research*, 1999, 45, 285, incorporated herein by reference. The concentrations of the ions in the SBF may also be varied to adjust the rate of the deposition. It is believed that such techniques effectively modify the surface topography and chemistry without deleteriously affecting the macro pores and nano-fibrous structure of the porous material (e.g., gelatin scaffold).

Still further, a fourth embodiment for modification of the porous materials includes incorporating inorganic material particles into the interconnected porous materials. As previously mentioned, phase separation and porogen leaching techniques may be used to obtain such porous materials.

The polymers and macromolecules that may be used as the porous materials and/or coating materials in accordance with the present disclosure are numerous. Some exemplary, non-limitative water insoluble (hydrophobic) polymers/macromolecules that are suitable for the porous materials and/or for coating on hydrophilic porous materials include at least one of polytetrafluoroethylene (PTFE), polyvinylchloride (PVC), polyethylenes (PE), polypropylenes (PP), polystyrenes, polyacrylonitrile (PAN), polymethylmethacrylate (PMMA), polyvinylacetate (PVAc), polyphenylene oxide, polypropylene oxide (PPO), polyvinylidene fluoride (PVDF), polybutylene, polyamides (PA, Nylons), polyesters, polycarbonates, polyurethanes, polysiloxanes, polyimides, polyetheretherketone (PEEK), polysulfones, polyethersulphone, cellulose and its derivatives, and mixtures thereof.

When in situ polymerization is used instead of polymers/macromolecules to form porous materials and/or coatings, some exemplary suitable hydrophobic unsaturated monomers include, but are not limited to the following: at least one of acrylates, methacrylates (eg. methyl methacrylate), ethylene, propylene, tetra-fluoroethylene, styrene, vinyl chloride, vinylidene chloride, vinyl acetate, acrylonitrile, 2,2-bis[4-(2-hydroxy-3-methacryloyloxy-propyloxy)-phenyl]propane (Bis-GMA), ethyleneglycol dimethacrylate (EGDMA), triethyleneglycol dimethacrylate (TEGDMA), bis(2-methacryly-oxyethyl) ester of isophthalic acid (MEI), bis(2-methacrylyoxyethyl)ester of terephthalic acid (MET), bis(2-methacrylyoxyethyl)ester of phthalic acid (MEP), 2,2-bis(4-methacrylyoxy phenyl)propane (BisMA), 2,2-bis[4-(2-methacrylyloxyethoxy)phenyl]propane (BisEMA), 2,2-bis[4-(3-methacrylyloxy-propoxy)phenyl]propane (BisPMA), hexafluoro-1,5-pentanediol dimethacrylate (HFPDMA), bis-(2-methacrylyloxyethoxy-hexafluoro-2-propyl)benzene [Bis(MEHFP)φ], 1,6-bis(methacrylyloxy-2-ethoxycarbonylamino)-2,4,4-tri-methylhexan (UEDMA), spiro orthocarbonates, other vinyl monomers, the derivatives of these monomers, and mixtures thereof.

Monomers of condensation polymers can also be used to form porous materials and/or coatings in situ. Some non-limitative monomer types in this category are diacids and diols (pairs), ω-hydroxy carboxylic acids, lactones, diacids and diamines (pairs), amino acids, lactams, diisocyanates and diols (pairs), and mixtures thereof.

Certain biodegradable polymers and macromolecules may also be used as the porous materials and/or coatings, for example, when controlled release properties are desired. Some exemplary, non-limitative biodegradable polymers include at least one of poly(lactide-co-glycolide) (PLGA), poly(L-lactic acid) (PLLA), poly(D,L-lactic acid) (PDLLA), polyglycolic acid (PGA), polyanhydrides, poly(ortho ethers), poly(ε-caprolactone) (PCL), poly(hydroxy butyrate) (PHB), poly(propylene fumarate) (PPF), polyphosphoesters (PPE), polyphosphazenes, and mixtures thereof. Further suitable non-limitative examples include degradable natural macromolecules (typically enzymatically degradable) such as collagen, gelatin, and many other proteins, carbohydrates, and their derivatives.

Some exemplary, non-limitative water-soluble (hydrophilic) polymers/macromolecules that are suitable for the porous materials and/or for coating on hydrophobic porous materials include polyvinyl alcohol, polyethylene oxide (polyethylene glycol), polymethacrylic acid (PMAA), polyvinyl pyrolidone, polyacrylic acid, poly(lysine), poly(allylamine), poly(ethylenimine), poly(acrylamide), poly(acrylamide-co-arylic acid), poly(acrylamide-co-diallyldimethylammonium chloride), poly(vinyl alcohol), poly(ethylene glycol), polyethylene-block-poly(ethylene glycol), poly(propylene glycol), poly(2-hydroxypropyl methacrylate), poly(2-hydroxyethyl methyacrylate), poly(4-hydroxystrene), polyethylene monoalcohol, poly(vinyl alcohol-co-ethylene), poly(styrene-co-allyl alcohol), hydroxyethylcellulose, alginate, pectin, chitin, chitosan, dextran, hyaluronic acid, collagen, gelatin, and mixtures thereof.

Certain such polymers/macromolecules may also be synthesized in situ to form porous materials and/or coatings. Some non-limitative examples of suitable acid-containing hydrophilic monomers include at least one of monomers containing carboxylic acid: acrylic acid, methacrylic acid, 4-vinylbenzoic acid, crotonic acid, oleic acid, elaidic acid, itaconic acid, maleic acid, fumaric acid, acetylenedicarboxylic acid, tricarbollylic acid, sorbic acid, linoleic acid, linolenic acid, cicosapentenoic acid, other unsaturated carboxylic acids, anhydrides, their derivatives, and/or mixtures thereof; and/or other organic acids such as sulfonic acid, and/or phosphonic acid replacement of the carboxyl group of the above listed unsaturated carboxylic acids, their derivatives, and/or mixtures thereof.

Some non-limitative suitable amine-containing hydrophilic monomers include at least one of allylmine, 4-vinylaniline, L-lysine, D-lysine, DL-lysine, acrylamide, derivatives thereof, and mixtures thereof. Some exemplary suitable hydroxyl-containing hydrophilic monomers include, but are not limited to 2-hydroxypropyl methacrylate, 2-hydroxyethyl methyacrylate, 4-hydroxystrene, ethylene glycol, propylene glycol, derivatives thereof, and/or mixtures thereof.

Poly(ethylene glycol)acrylate, poly(ethylene glycol)methacrylate, and/or mixtures thereof may also be used to form porous materials and/or coatings.

Many natural macromolecules and synthetic polymers can be both hydrophilic and hydrophobic (amphiphilic). They could also be used to form porous materials and/or for certain coating applications. Non-limitative examples of these materials include those containing acid, amine, hydroxyl, or/and other hydrophilic groups in some and/or all of their structural units. Many of them may be copolymers in some way, containing both hydrophilic and hydrophobic moieties.

For many of the examples given above, there may be specific crosslinking agent(s) to crosslink, if desired. Some exemplary crosslinking agents include, but are not limited to ethyl-3-(3-dimethylaminopropyl) carbodiimide HCl (EDC), dialdehydes (e.g. glutaraldehyde), ethylene glycol dimethacrylate, N,N-methylenebisacrylamide, 1,6-hexamethylenediisocyanate, divinylsulfone, 1,6-hexanedibromide, PEG diacrylate, PEG dimethacrylate, dextramethacrylate, and/or mixtures thereof.

It is to be understood that, for any of the examples of macromolecules/polymers mentioned herein, other suitable non-limitative examples include oligomers of any of those macromolecules/polymers, and/or fragments of any of those macromolecules/polymers.

To illustrate the present disclosure, the following examples are provided. However, these examples are intended to be illustrative and should not be considered to limit the scope of the present disclosure.

EXAMPLES

Example 1

Preparation of Porous Gelatin Materials

Gelatin was dissolved in ethanol/water (or water, methanol/water, dioxane/water, acetone/water) solvent mixtures to form gelatin solutions of different concentrations (from 2% (m/v) to 20% (m/v)). The stock gelatin solution was stored in a water bath to maintain at a desired temperature (40° C. to 80° C.). 2 mL gelatin solution was added to a Teflon vial (cylindrical in shape with a diameter of 18 mm) and capped. The Teflon vial with gelatin solution was quickly transferred to a freezer at −76° C., −18° C., 4° C., or left at room temperature. The gelatin solution was maintained at the desired temperature (gel formation) for about 4 hours. It is to be understood that the gelatin solution may be maintained at the desired temperature for any suitable length of time, non-limiting examples of which may range from about 1 hour to about 6 hours. The gelatin gels were soaked in 50 mL cold ethanol (−18° C.) for 24 h (for ethanol/water system). The gels were then transferred into 50 mL dioxane for solvent exchange (for ethanol/water, methanol/water, and acetone/ water systems). Dioxane on the surface of the gelatin gel was wiped with blotting paper, and the gel was frozen at −18° C. for at least 12 h. The gel was freeze-dried in an ice/salt bath at −5° C. to −10° C. for one week.

Example 2

Preparation of Nano-Fibrous and Macro/Micro-Porous Gelatin Materials

Macro/micro-porous and nano-fibrous gelatin materials (scaffolds) were fabricated by combining particulate-leaching and phase-separation techniques. Paraffin spheres were prepared as reported at Ma, P. X. and Choi J. "Biodegradable polymer scaffolds with well-defined interconnected spherical pore network," *Tissue Engineering* 7(1): 23-33 (2001), the disclosure of which is incorporated herein by reference in its entirety. 0.4 g paraffin spheres of selected size (diameter range: 150-250 µm, 250-420 µm, or 420-600 µm) were added to Teflon molds (cylindrical vials with a diameter of 18 mm), and the top surface was leveled. The molds were then preheated at 37° C. for 20, 40, 80, or 200 minutes to ensure that paraffin spheres were substantially adhered to each other. Solutions of various concentrations were prepared. For example, to prepare 5% gelatin solution, 1 g gelatin was dissolved in 10 mL water and 10 mL ethanol solvent mixture at 45° C. 0.35 mL gelatin solution was cast onto the paraffin sphere assemblies. The gelatin/paraffin composite was quickly transferred into a freezer at a preset temperature (e.g., −76, −18, 4° C.) or under room temperature to induce phase separation for 4 hours. The time for inducing phase separation may be longer or shorter, depending at least in part on the temperature and materials used.

The gelatin/paraffin composite was then soaked in 50 mL cold ethanol (−18° C.) for 24 h. The composite was then transferred into 50 mL 1,4-dioxane for solvent exchange for 24 h with fresh 1,4-dioxane replaced every 8 h. The composite was then kept in a freezer at −18° C. for 12 h to be completely frozen. The frozen composite was freeze-dried in an ice/salt bath for 4 days followed by vacuum drying at room temperature for 3 days.

The gelatin/paraffin composite was cut into discs with 2.0 mm thickness. The composite was soaked in 50 mL hexane to leach out paraffin spheres. Hexane was changed every 12 hours for 6 times. To accelerate the dissolution of paraffin spheres, the process of dissolving paraffin may be carried out in an oven at 37° C. Cyclohexane was used for solvent exchange. The gelatin scaffold was frozen at −18° C. for 12 hours and freeze-dried at between −10° C. and −5° C. in an ice/salt bath for 4 days followed by vacuum drying at room temperature for 3 days.

Solid-walled gelatin scaffolds were also prepared by using a similar procedure except that the gelatin/paraffin composite was air-dried and no solvent extraction was applied.

Example 3

Chemical Crosslinking of 3D Nano-Fibrous and Macroporous Gelatin Matrices

Chemical crosslinking of 3D gelatin scaffold using 1-ethyl-3-(3-dimethylaminopropyl)carbodiimide HCl (EDC) and N-hydroxy-succinimide (NHS) was carried out in {2-[N-morpholino]ethanesulfonic acid}hydrate (MES) buffer (pH 5.3, 0.05 M) at 4° C. for 24 hours. To maintain the microstructures of gelatin matrices and prevent the swelling of gelatin matrices in water, 90/10 (v/v) dioxane/water (or 90/10 (v/v) acetone/water) solvent mixtures were chosen instead of water. In detail, 0.122 g MES was dissolved in 5 mL double distilled water and the buffer solution temperature was adjusted to 4° C. 0.0115 g NHS and 0.096 g EDC were added to the buffer solution. 45 mL dioxane (or acetone) was added after NHS and EDC were dissolved. Gelatin scaffold samples (about 50 mg) were then added to the solution for chemical crosslinking for about 24 hours. The solution temperature was controlled at 4° C. during the reaction. The scaffolds were then washed with distilled water at 37° C. three times and were frozen at −18° C. for about 12 hours. The chemically crosslinked scaffolds were freeze-dried for 4 days and vacuum dried at room temperature for 3 days. The dried gelatin foam was then stored in a desiccator for later use.

Example 4

Surface Coating of Nano-Fibrous PLLA Scaffolds Using a Self-Assembly Process

PLLA scaffolds were first wetted in ethanol solution for about 2 hours and rinsed to remove possible surface contaminants. A series of water/ethanol solvent mixtures (30/70, 50/50, 70/30, 80/20, 90/10, and 100/0) were used for solvent exchange. The PLLA scaffolds were then soaked in Milli-Q water ($\Omega$>18.2 M$\Omega$·cm) for 2 days before self-assembly process began.

The pretreated PLLA scaffolds were first activated in an aqueous poly(diallyldimethylammonium chloride) (PDAC) solution at a concentration of 1.0 mg/mL for 60 minutes to obtain stable positively charged surfaces. After being washed with water for 60 seconds, the scaffolds were dipped in 1.0 mg/mL gelatin solution (pH=7.68) for 20 minutes and then washed with water for 60 seconds. The scaffolds were again exposed to PDAC solution for 20 minutes. After the same washing procedure as above, the scaffolds were dipped in gelatin solution for 20 minutes and rinsed with water again. The additional coating of PDAC/gelatin bilayers was accomplished by the repetition of the same cycle of immersion in PDAC, rinsing with water, immersion in gelatin solution, and rinsing with water.

After the desired number of bilayers were deposited and washed with water, the PDAC/gelatin was fixed by crosslinking gelatin with EDC and NHS in MES buffer at 4° C. for about 24 hours. After being rinsed with water at 37° C. for 60 minutes, the scaffold surfaces were blotted with filtered paper and then transferred into a freezer set to −18° C. and kept for about 4 hours. The surface-modified scaffolds were then freeze-dried for 5 days.

Example 5

Surface Coating of Nano-Fibrous PLLA Scaffolds Using an Entrapment Process

PLLA scaffolds were first soaked in ethanol for 2 hours, and then washed with double distilled water. Gelatin was dissolved in dioxane/water solvent mixture at 45° C. The pretreated PLLA scaffolds were immersed in the solution and soaked for a designated time, and then moved out and quickly put into 200 mL ice-water mixture for 10 minutes. Chemical crosslinking of gelatin with EDC and NHS was carried out in MES buffer at 4° C. for 24 hours. The scaffolds were then washed with distilled water at 4° C. for 3 times, followed by rinsing in water at 40° C. for 12 hours (water was changed every 3 hours) to ensure the removal of un-entrapped gelatins.

The surface-modified scaffolds were freeze-dried for 3 days, and then vacuum dried at room temperature for 2 more days.

Example 6

Scanning Electron Microscopy (SEM) Examination

The morphology of the scaffolds was observed using SEM (Philips XL30 FEG). The scaffolds were coated with gold using a sputter coater (DeskII, Denton vacuum Inc). During the process of gold coating, the gas pressure was kept at 50 mtorr, and the current was 40 mA. The coating time was 200 s. Samples were analyzed at 10 kV.

Example 7

Mechanical Testing

The compressive moduli of PLLA scaffolds were measured using an MTS Synergie 200 mechanical tester (MTS Systems Corporation, Eden Prairie, Minn.). For compressive testing, the specimens were circular discs about 17 mm in diameter and 3.0 mm in thickness. The crosshead speed was 0.5 mm/min and the compressive modulus was defined as the initial linear modulus. Six specimens were tested for each sample. The averages and standard deviations were graphed. To compare mechanical properties, a two-tailed Student's t-test (assuming equal variances) was performed to determine the statistical significance ($p<0.05$).

Example 8

Surface Area Measurement

The surface area of nano-fibrous gelatin scaffold was measured using a BELSORP-mini gas adsorption instrument (BEL Japan, Inc.). At least 0.1 g sample was used for each measurement, and BET method was used for calculation.

Example 9

Porosity

Porosity $\epsilon$ was calculated as:

$$\epsilon = 1 - D_p/D_0$$

Where $D_p$ is the overall density of gelatin foam, and $D_0$ is the density of gelatin. $D_p$ was determined by:

$$D_p = \frac{4m}{\pi d^2 h}$$

Where m was the mass, d was the diameter, and h was the thickness of the foam. For the gelatin we used (Type B: from calf skin, Approx. 225 Bloom), $D_0 = 1.35$ g/cm$^3$.

Example 10

Swelling Ratio

Swelling ratio $\omega$ was defined as:

$$\omega = W/W_0$$

where W was the actual weight of gelatin foam in solution, and $W_0$ was the original dry weight. The surface of samples was blotted with filter paper when the samples were taken out from solution. For equilibrium swelling ratio $\omega_e$, the scaffold samples were soaked in the solution for 2 h before measurement. All data were presented as means±standard deviation (SD). To test the significance of observed differences between the study groups, an unpaired Student's t-test was applied. A value of $p<0.05$ was considered to be statistically significant.

Example 11

Gelatin/Water System

Gelatin was dissolved in double distilled water to form different concentrations of gelatin solutions (e.g. 2% or 5% (g/mL)). The gelatin solution temperature was balanced at 50° C. in a water bath. 2 mL gelatin solution was added to a Teflon vial and capped. The Teflon vial with gelatin solution was quickly transferred to a freezer at −76° C. (or −18° C.). The gelation of gelatin solution occurred and the gel was kept at the temperature for about 2 hours. The frozen gelatin gel was freezing-dried at ice-salt bath at −5° C. to −10° C. for one week.

Porous gelatin foam was created with a pore size ranging from 50 μm to 500 μm. Decreasing gelation temperature led to the decrease of average pore size. Most of pores were irregular closed pores. The surface of pore wall was smooth with no specific microstructure observed (FIG. 1).

Example 12

Gelatin in Acetone/Water Mixture

The procedure was similar to that for preparing gelatin foams with water except that acetone/water solvent mixture was utilized instead of water. The acetone/water mixture composition ranges from 5/95 to 30/70 (v/v).

Figure 2:
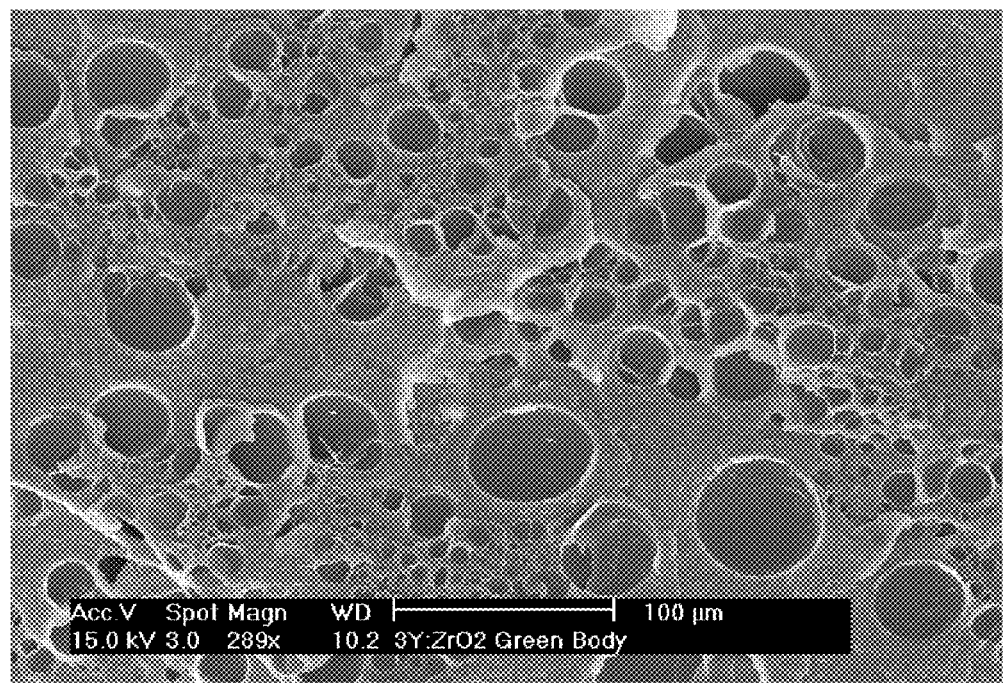
FIG. 2 is a SEM micrograph of a porous material formed from a 5% gelatin in 20/80 (v/v) acetone/water solvent mixture, dissolved at 50° C. and gelled at −76° C.

Gelatin foams were created with pore size ranging from 10 μm to 50 μm. Thick pore walls (10 μm to 50 μm) and uneven pore distribution were observed. Most of pores were round close pores. The surface of pore wall was smooth with no special microstructures (FIG. 2).

Example 13

Gelatin in Dioxane/Water Mixture

The procedure was similar to that of preparing gelatin foams with water except that dioxane/water solvent mixture was utilized instead of water. The dioxane/water mixture composition ranges from 5/95 to 40/60 (v/v).

Figure 3:
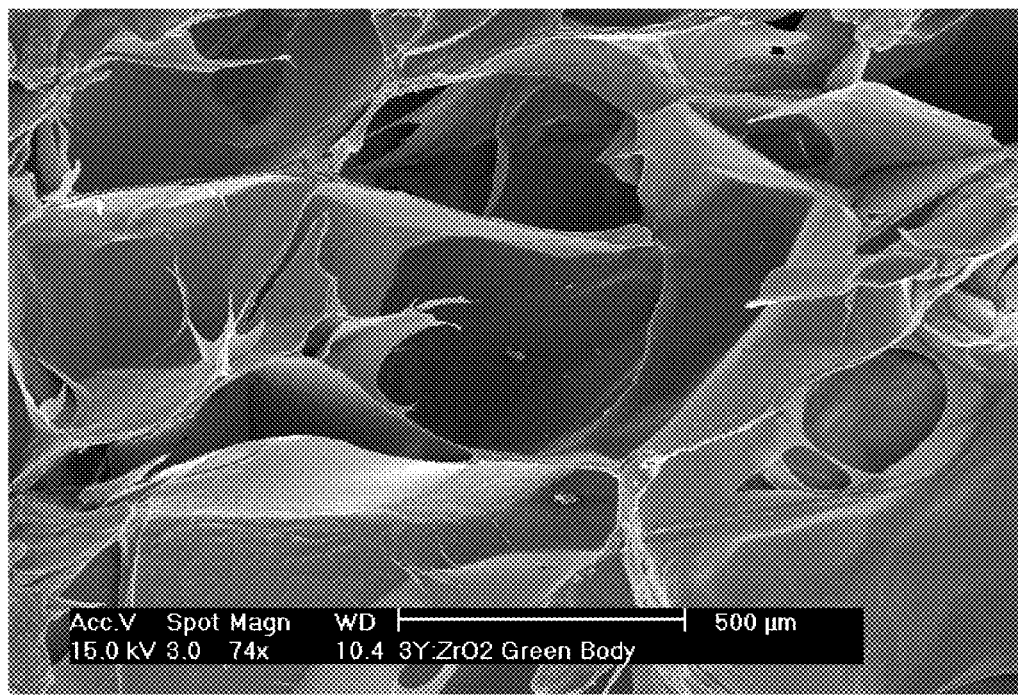
FIG. 3 is a SEM micrograph of a porous material formed from a 5% gelatin in 20/80 (v/v) dioxane/water solvent mixture, dissolved at 50° C. and gelled at −76° C.

Gelatin foams were created with pore size ranging from 50 μm to 500 μm. Increasing the ratio of dioxane in solvent mixture led to the decrease of pore size. Most of pores were irregular close pores. The surface of pore wall was smooth with no specific microstructure was observed (FIG. 3).

Example 14

Gelatin in Ethanol/Water Mixture

Gelatin was dissolved in ethanol/water solvent mixture to form different concentrations of gelatin solutions (from 2% (m/v) to 20% (m/v)). The gelatin solution temperature was balanced in a water bath (temperature ranges from 40° C. to 80° C.). 2 mL gelatin solution was added to a Teflon vial and capped. The Teflon vial with gelatin solution was quickly transferred to a freezer at −76° C., −18° C., 4° C., or left at room temperature. The gelatin solution was maintained at the desired temperature (gel formation) for about 4 hours. The gelatin gels were soaked in 50 mL cold ethanol (−18° C.) for 24 h. The gels were then transferred into 50 mL dioxane for solvent exchange. Dioxane on the surface of the gelatin gel was wiped with blotting paper and the gel was frozen at −18° C. for at least 12 h. The gel was freeze-dried in an ice/salt bath at −5° C. to −10° C. for one week.

Figure 4:
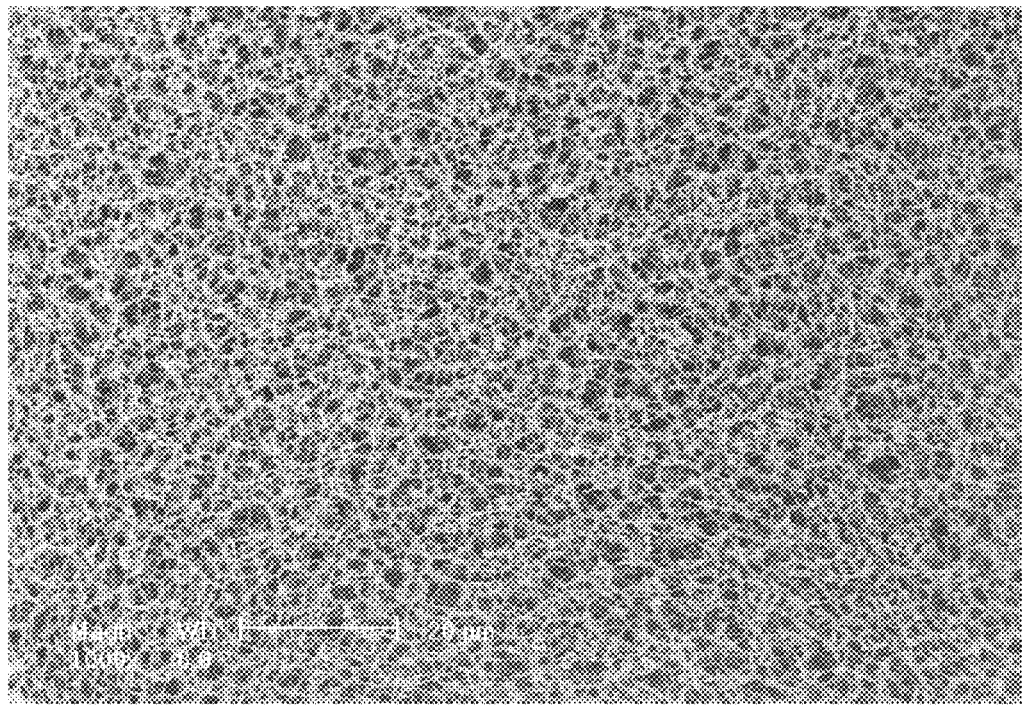
FIG. 4 is a SEM micrograph of a porous material formed from a 2.5% gelatin in 40/60 (v/v) ethanol/water solvent mixture, dissolved at 50° C. and gelled at −76° C.

Nano-fibrous gelatin microstructure was created with fiber diameters ranging from 50 nm to 500 mm. No macropores (>10 um) were observed inside the gelatin foam (FIG. 4).

Example 15

Gelatin in Methanol/Water Mixture

The procedure was similar to that for preparing gelatin foams with ethanol/water except that methanol was utilized instead of ethanol. The methanol/water mixture composition ranged from 20/80 to 50/50 (v/v) in this example.

Figure 5:
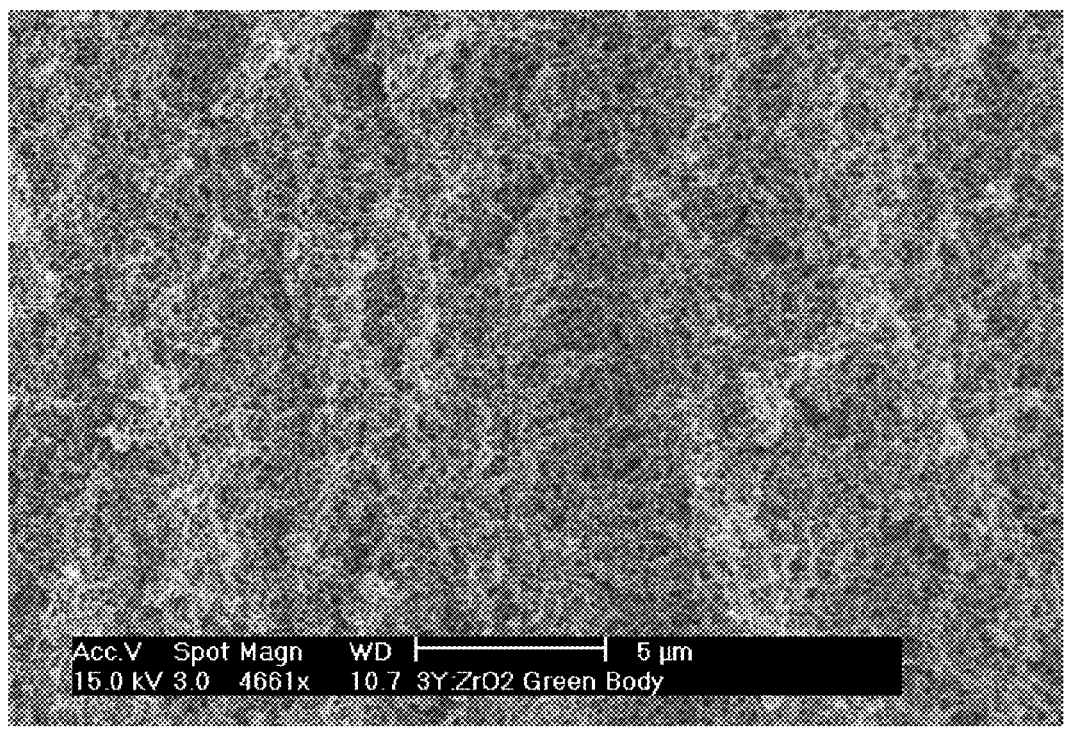
FIG. 5 is a SEM micrograph of a porous material formed from a 5% gelatin in 20/80 (v/v) methanol/water solvent mixture, dissolved at 50° C. and gelled at −76° C.
Figure 6A:
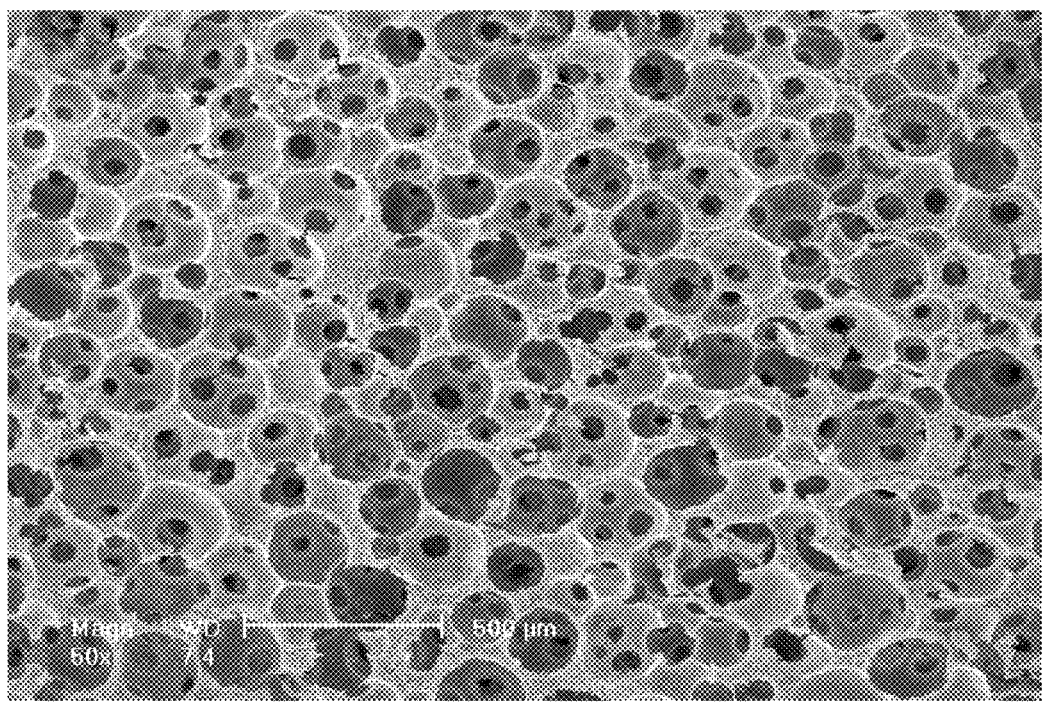
FIG. 6A is a SEM micrograph of macro-porous and nano-fibrous gelatin scaffolds prepared from a 50/50 ethanol/water solvent mixture and paraffin spheres at 50× magnification.
Figure 6B:
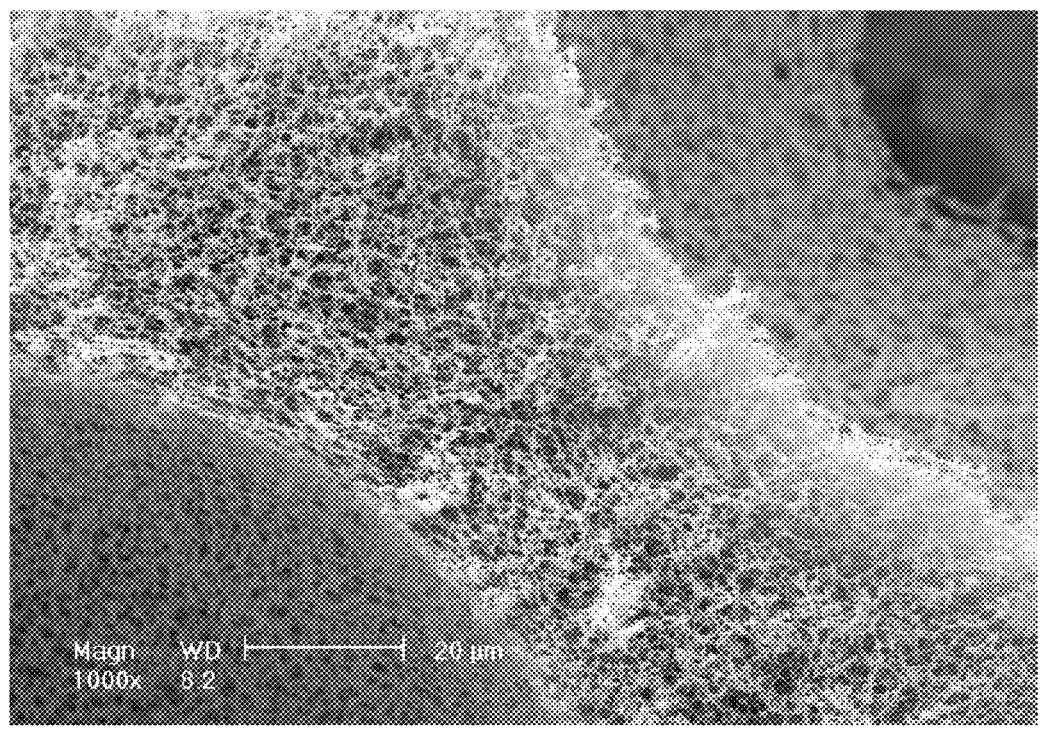
FIG. 6B is a SEM micrograph of macro-porous and nano-fibrous gelatin scaffolds prepared from a 50/50 ethanol/water solvent mixture and paraffin spheres at 1000× magnification.
Figure 6C:
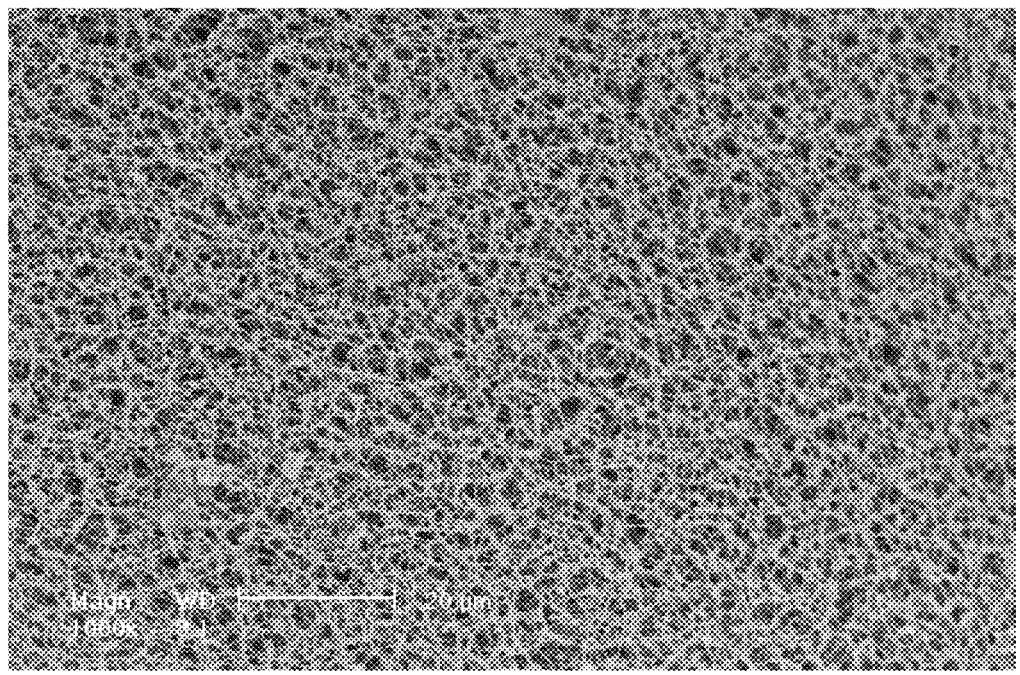
FIG. 6C is a SEM micrograph of macro-porous and nano-fibrous gelatin scaffolds prepared from a 50/50 ethanol/water solvent mixture and paraffin spheres at 1000× magnification.
Figure 6D:
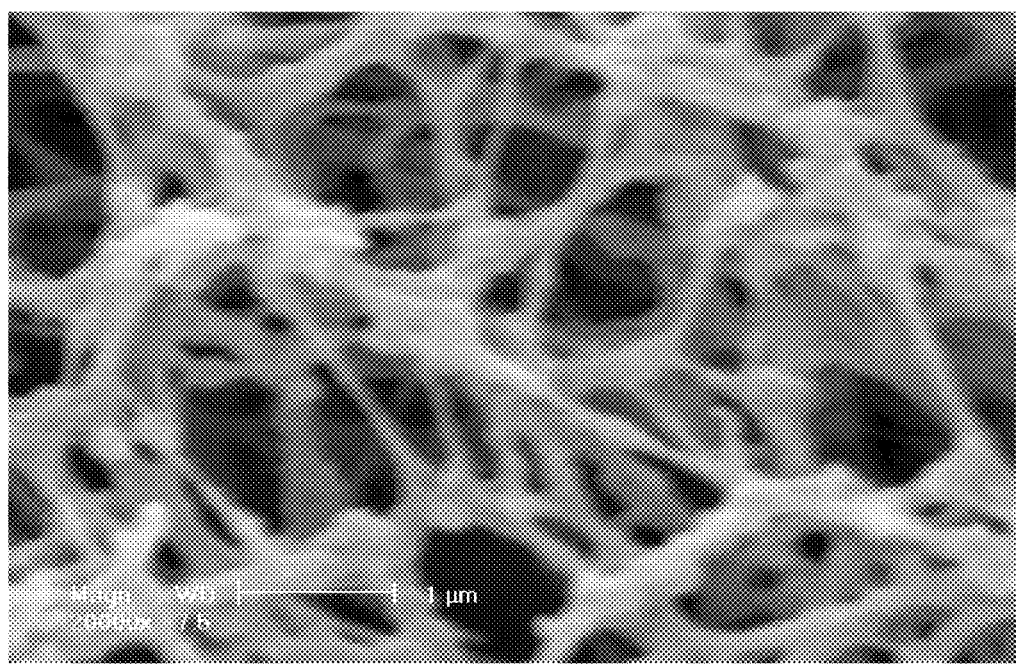
FIG. 6D is a SEM micrograph of macro-porous and nano-fibrous gelatin scaffolds prepared from a 50/50 ethanol/water solvent mixture and paraffin spheres at 20,000× magnification.

Nano-fibrous microstructure was obtained with the methanol/water solvent mixture composition ranging from 20/80 (v/v) to 50/50 (v/v). Lower gelation temperature leads to more typical nano-fibrous structure, while only agglomerates were observed in foams prepared at room temperature. The increase of gelatin solution concentration led to increase of network density of the gel. No macropores (>10 um) were observed inside the gelatin foam (FIG. 5).

Example 16

Macroporous and Nano-Fibrous Gelatin Materials

Nano-fibrous gelatin scaffolds with designed macropores were fabricated by combining particulate-leaching technique and phase-separation techniques (see Example 2). The matrices have very high porosity (Table 1). The porosity decreased with increasing gelatin concentration. Porosity as high as 98% was obtained when gelatin concentration was 5%. The fiber diameter ranged from 50 nm to 500 nm. The average fiber diameter did not statistically change with gelatin concentration. It is also worth noticing that the fiber diameter of the scaffolds became more uniform as the gelatin solution concentration increased.

SEM images demonstrated the interconnected open pore structure and nano-fibrous pore walls (FIG. 6). There were three size scales involved in these gelatin scaffolds, that is, the macropore size, interfiber distance, and fiber diameter. The macropores were a few hundred micrometers in size determined by paraffin sphere size. The interfiber distance, which ranged from several hundred nanometers to tens of micrometers, was determined by the gelatin solution concentration.

Example 17

Figure 7A:
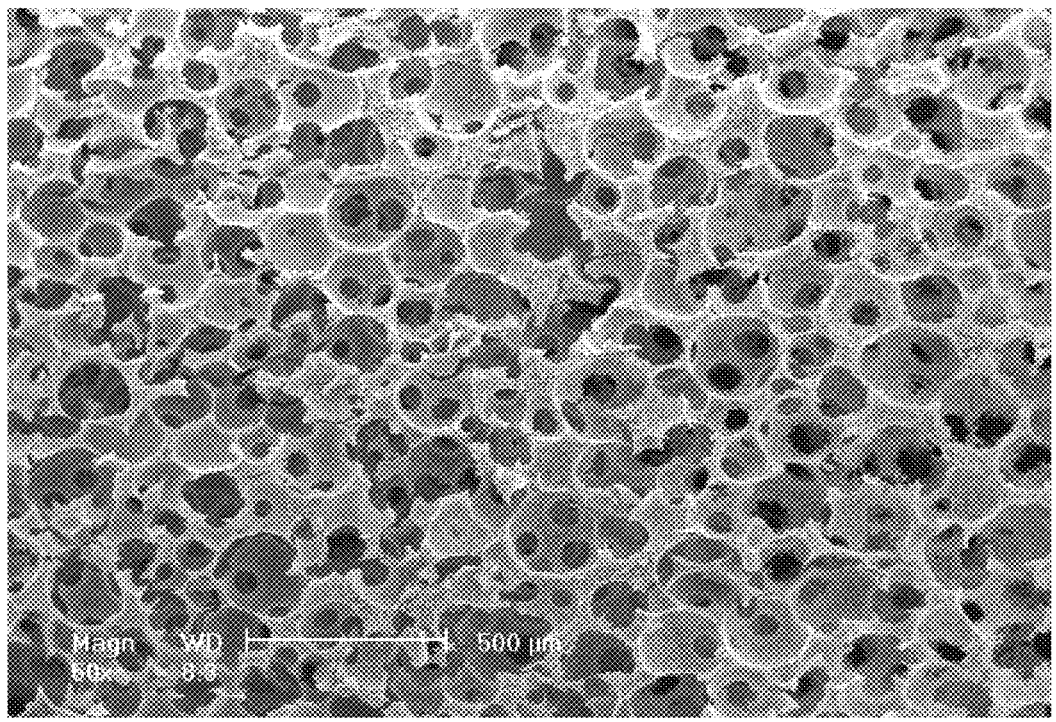
FIG. 7A is a SEM micrograph of a nano-fibrous gelatin scaffold fabricated from a 5% (wt/v) ethanol/water (v/v=50/50) solution, and paraffin spheres were heat treated at 37° C. for 25 min, having a paraffin sphere size, d=150-250 μm.
Figure 7B:
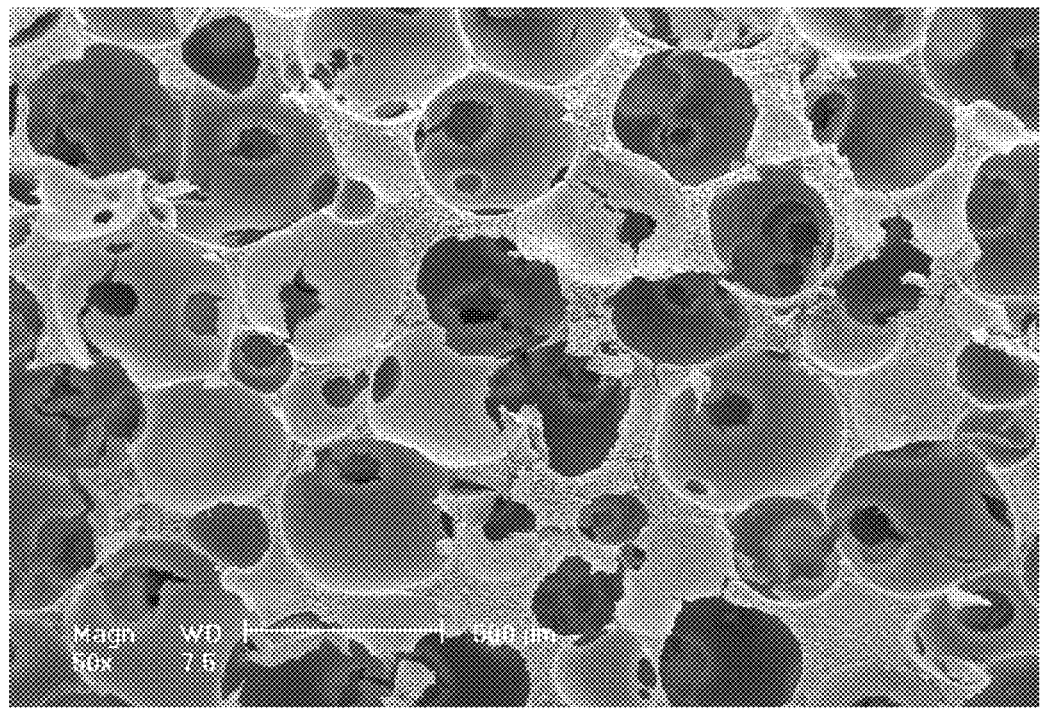
FIG. 7B is a SEM micrograph of a nano-fibrous gelatin scaffold fabricated from a 5% (wt/v) ethanol/water (v/v=50/50) solution, and paraffin spheres were heat treated at 37° C. for 25 min, having a paraffin sphere size, d=420-500 μm.
Figure 8A:
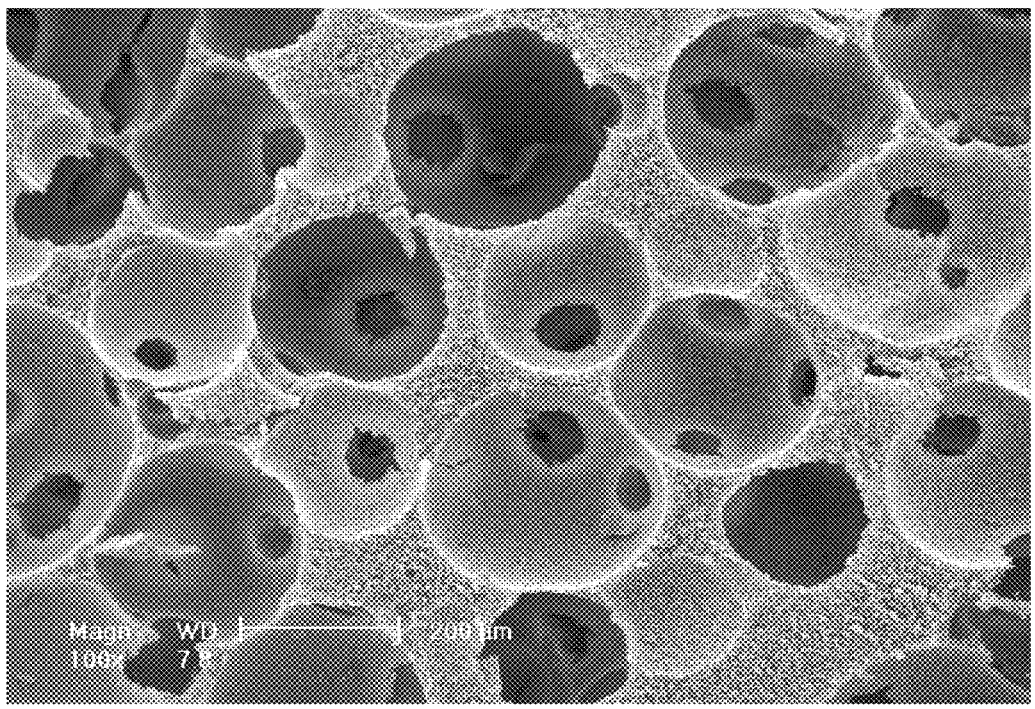
FIG. 8A is a SEM micrograph of a nano-fibrous gelatin scaffold fabricated from a 5% (wt/v) ethanol/water (v/v=50/50) solution, with paraffin spheres heat-treated for 20 min.
Figure 8B:
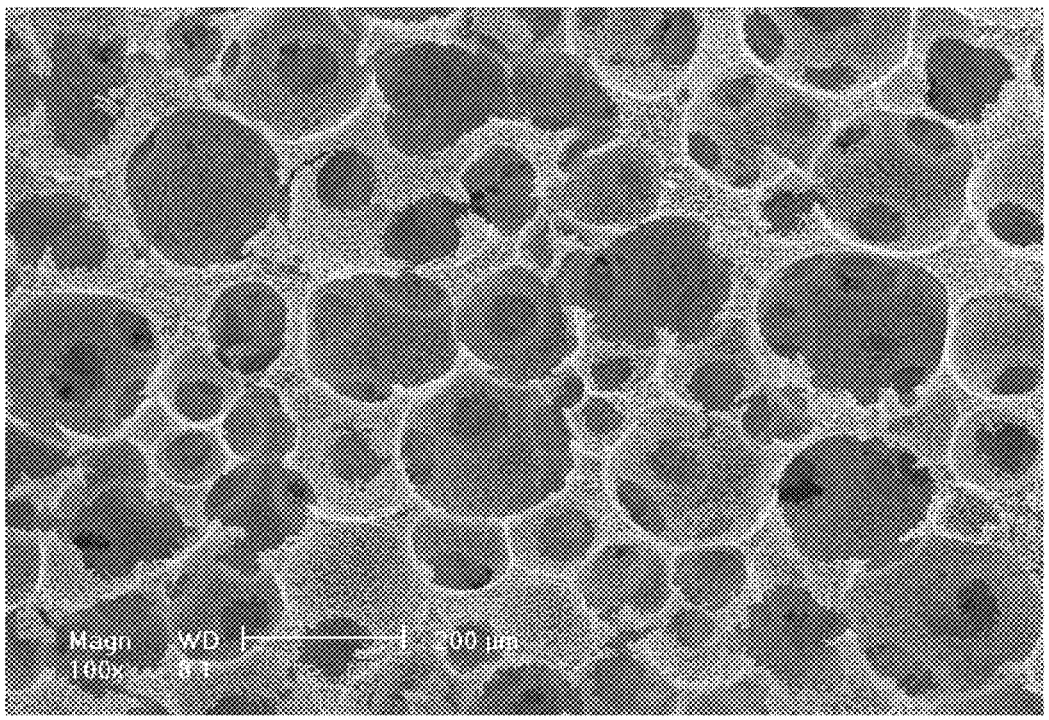
FIG. 8B is a SEM micrograph of a nano-fibrous gelatin scaffold fabricated from a 5% (wt/v) ethanol/water (v/v=50/50) solution, with paraffin spheres heat-treated for 40 min.
Figure 8C:
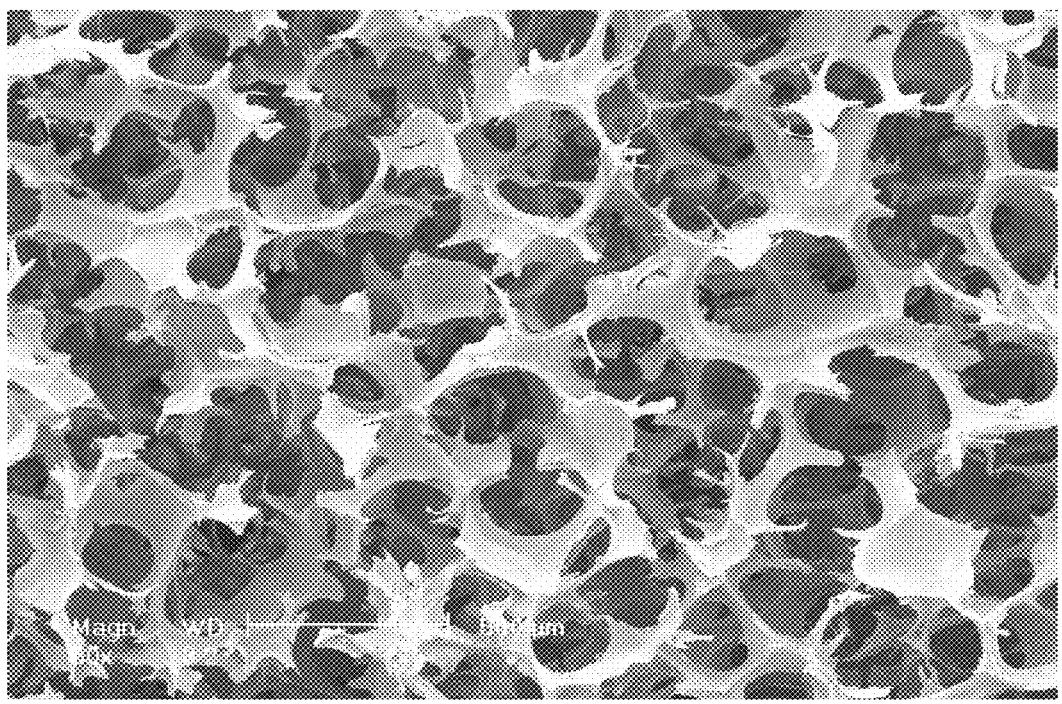
FIG. 8C is a SEM micrograph of a nano-fibrous gelatin scaffold fabricated from a 5% (wt/v) ethanol/water (v/v=50/50) solution, with paraffin spheres heat-treated for 200 min.

Varying Macropore Size and Inter-Pore Connectivity of Nano-Fibrous Gelatin Materials Using different paraffin sphere size, one can obtain gelatin scaffolds with different macropore sizes (FIG. 7). The interconnectivity between the pores of the gelatin scaffold was controlled by varying the heat treatment time of paraffin spheres (FIG. 8). The longer time of heat treatment, the larger bonding areas between the spheres, and therefore higher interconnectivities between the macropores.

Example 18

Surface Area Analysis

Macro-porous and nano-fibrous gelatin scaffolds (7.5%, 250-420 µm paraffin spheres) had a surface area of 32.02 (m²/g) as measured using method described earlier (Example 8).

Figure 12:
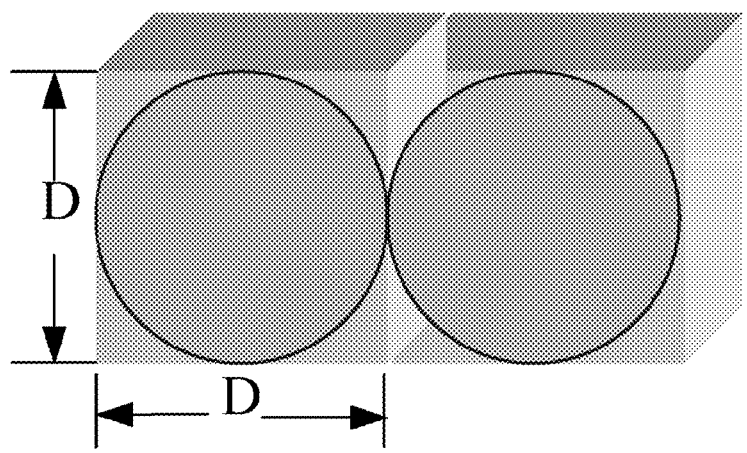
FIG. 12 is a schematic illustration of the pore structure.

Macro-porous solid-walled gelatin scaffolds (7.5%, 250-420 µm paraffin spheres) had a surface area too low to be measured using the instrument. A theoretical calculation was used to estimate the surface area (we assumed that the pores were closely contacted as illustrated in FIG. 12):

$$\text{Total mass of the scaffold: } M = nD_p V \quad (1)$$

Volume of one pore:

$$V = D^3 - \frac{1}{6}\pi D^3 \quad (2)$$

Surface area of one pore:

$$S = \frac{n}{4}\pi D^2 \quad (3)$$

where $D_p = 1.35$ g/cm³ for gelatin, D is the diameter of the pore (here the average value 300 µm was used), and n was the numbers of pores.

Combining equation (1), (2), and (3), the surface was derived:

$$S = \frac{1}{4}\left(\frac{M}{D_p V}\right)\pi D^2$$

$$= \frac{1}{4}\left[\frac{M}{D_p\left(D^3 - \frac{1}{6}\pi D^3\right)}\right]\pi D^2$$

$$= \frac{\pi}{4}\left[\frac{M}{(1-\pi/6)D_p D}\right]$$

When M=1.0 g, then $$S = \frac{3.14}{4}\left[\frac{10^{-3}}{(1-3.14/6)\times(1.35\times 10^3)\times(300\times 10^{-6})}\right]$$

$$= 4.07\times 10^{-3}(\text{m}^2/\text{g})$$

The pores were actually interconnected (not closely contacted), some surfaces of the pores were overlapped. Therefore, the real surface area of solid-walled scaffold would be less than the above estimation if the surfaces were entirely smooth as observed under SEM.

$$S_{nano}/S_{solid} > 32.02/(4.07 \times 10^{-3}) = 7.9 \times 10^3$$

The surface area of nano-fibrous scaffold was more than 3 orders of magnitude higher than that of solid-walled scaffold.

Example 19

Mechanical Properties of Gelatin Foams

Figure 9:
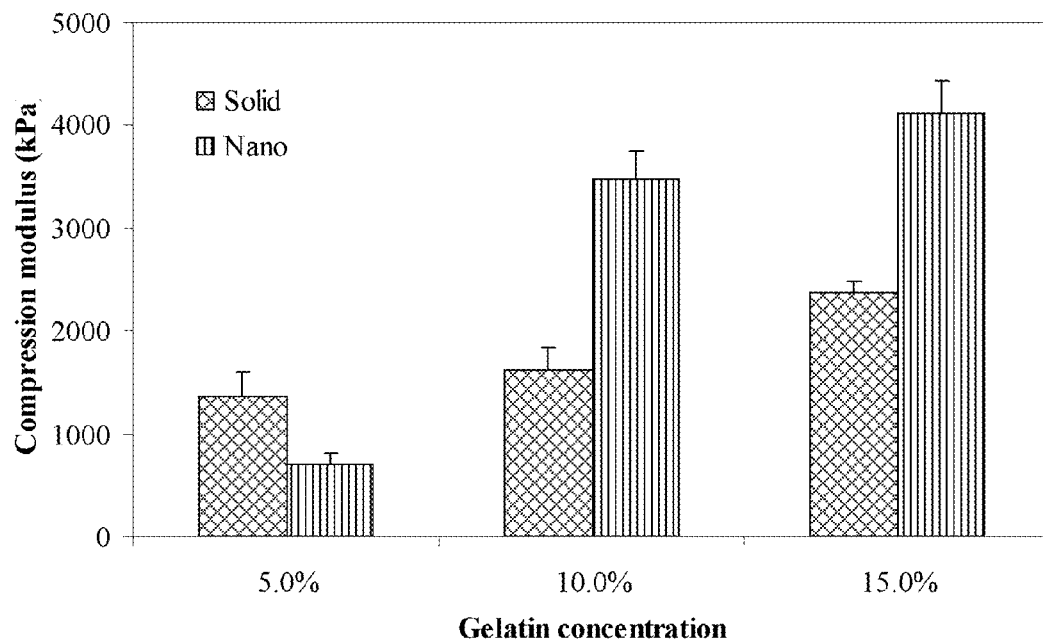
FIG. 9 is a chart showing compressive modulus of solid-walled and nano-fibrous gelatin foams prepared with different gelatin concentrations.
Figure 10:
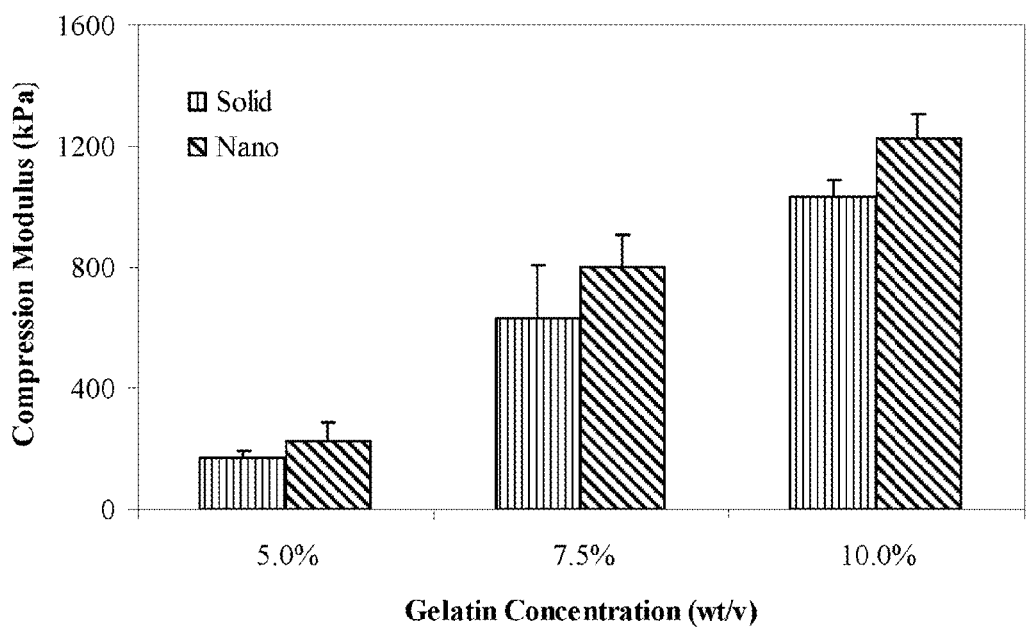
FIG. 10 is a chart showing compressive modulus of macro-porous solid-walled and nano-fibrous gelatin scaffolds prepared with different gelatin concentrations.

The compression modulus of solid-walled gelatin foam was higher than that of nano-fibrous gelatin foam at the concentration of 5.0%. However, the modulus of nano-fibrous gelatin foam increased much faster than that of solid-walled gelatin foam as gelatin concentration increased, and the compression modulus of nano-fibrous gelatin foam was significantly higher than that of solid-walled gel foam as the concentration increased to 10.0% or above (FIG. 9).

Example 20

Swelling Behavior of Macro-Porous Gelatin Scaffolds

Both solid-walled and nano-fibrous gelatin scaffolds had high volume swelling before they were chemical crosslinked (Table 2). After crosslinking, both solid-walled and nano-fibrous gelatin scaffolds could maintain their size and shape.

Example 21

Swelling Behavior of Macro-Porous PLLA Scaffolds

The PLLA scaffolds dissolve in $CH_2Cl_2$, $CHCl_3$ and Dioxane before their surfaces were coated with gelatin. After the surface was coated with gelatin, the PLLA scaffold could maintain its original size in the above solvents (Table 3).

Example 22

Effect of Crosslinking on Gelatin Foam Morphology in Water

Figure 11A:
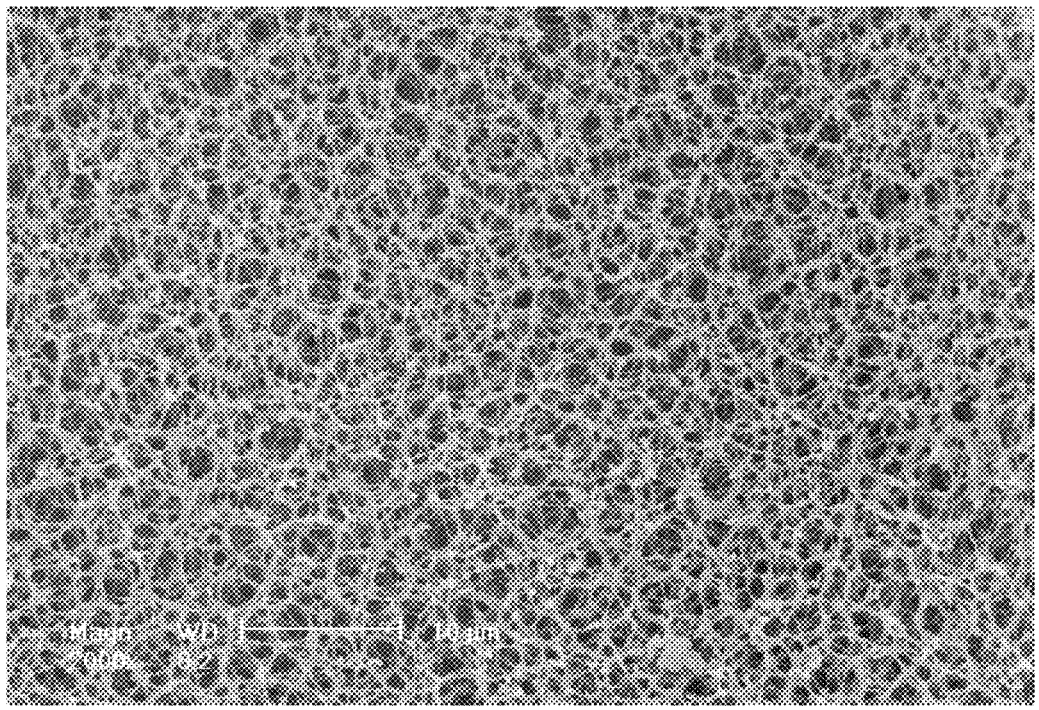
FIG. 11A is a SEM micrograph showing the surface morphology of nano-fibrous gelatin scaffolds.
Figure 11B:
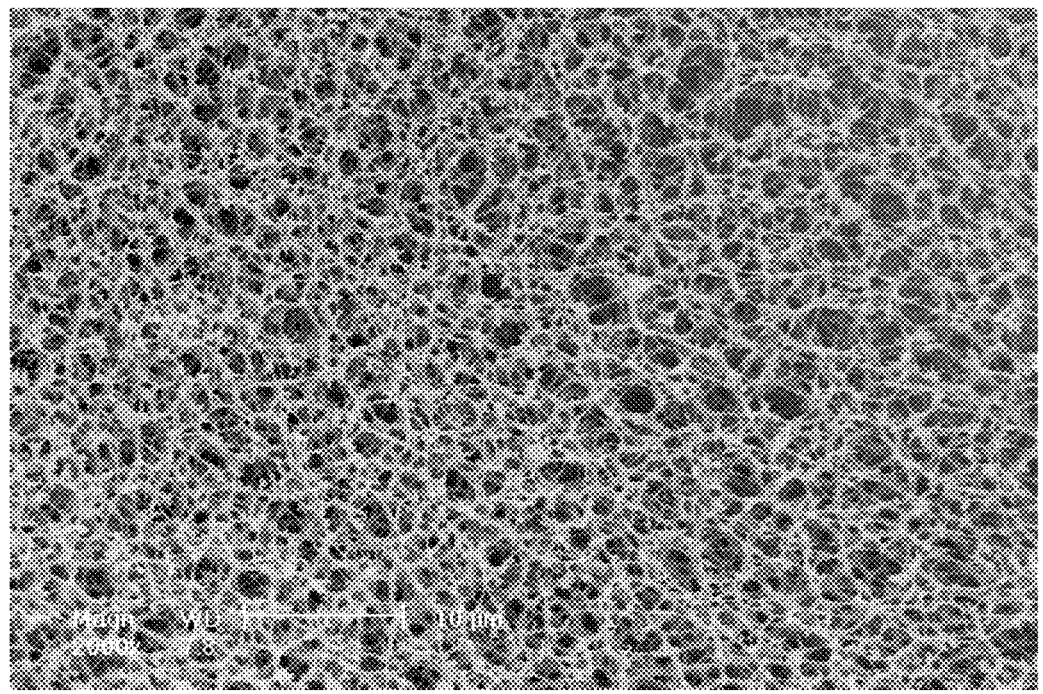
FIG. 11B is a SEM micrograph showing the surface morphology of the nano-fibrous gelatin scaffolds of FIG. 11A after crosslinking and immersion in water for 24 hours.

Nano-fibrous gelatin without crosslinking swelled enormously (Table 2) and lost the nano-fibrous feature upon immersion in water, while crosslinked nano-fibrous microstructure maintained its size and nano-fibrous structure (Table 2 and FIG. 11).

TABLE 1

Structural parameters of macro-porous and nano-fibrous gelatin scaffolds prepared using varying gelatin concentrations.

| Gelatin concentration (%) | Fibers diameter (nm) | Fiber length (nm) | Porosity (%) | Surface Area (m²/g) |
|---|---|---|---|---|
| 5.0 | 177 ± 62 | 1181 ± 413 | 98.06 ± 0.07 | 33.63 |
| 7.5 | 161 ± 45 | 666 ± 156 | 97.51 ± 0.03 | 34.76 |
| 10.0 | 157 ± 49 | 497 ± 62 | 96.45 ± 0.19 | 36.92 |

TABLE 2

Volume ratio ($V/V_0$) of gelatin scaffolds in water (measured after immersion in water for 24 h). The chemical crosslinking was carried out in an acetone/water mixture (90/10).

| | | $V/V_0$ (%) | Description |
|---|---|---|---|
| Solid-walled scaffold | Before crosslinking | 169.3 ± 38.2 | Very difficult to handle |
| | After crosslinking | 101.8 ± 2.9 | Easy to handle, maintain the form when handling |
| Nano-fibrous scaffold | Before crosslinking | 177.8 ± 34.9 | Very difficult to handle |
| | After crosslinking | 101.2 ± 1.8 | Easy to handle, maintain the form when handling |

TABLE 3

Volume ratio ($V/V_0$) of PLLA scaffolds in different organic solvents (measured after immersion for 24 h).

| Solvents | | $CH_2Cl_2$ | $CHCl_3$ | Dioxane |
|---|---|---|---|---|
| Surface modified (Yes/No) | Yes | 101.2 ± 2.1 | 99.2 ± 1.7 | 100.9 ± 1.1 |
| | No | Dissolved immediately (<2 s) | Dissolved immediately | Dissolved slowly |

Example 23

Preparation of 3D Nano-Fibrous Gelatin Scaffolds, Comparison with GELFOAM® Scaffold, and Scaffold Characterization 3D nano-fibrous gelatin scaffolds were fabricated via a thermally induced phase separation technique in combination with a porogen leaching technique. Paraffin spheres were selected as the porogen. 0.4 grams of paraffin spheres having selected sizes (diameter range: 150-250 µm (shown in FIGS. 13A-13C), 250-420 µm, or 420-600 µm) were added to a cylindrical Teflon mold (~17 mm in diameter), and the top surface was leveled. The mold was then preheated at 37° C. for about 20 minutes to ensure that paraffin spheres were interconnected. Other suitable preheating times include 40 minutes, 80 minutes, or 200 minutes.

1.0 gram of gelatin was dissolved in a water (10 mL) and ethanol (10 mL) solvent mixture at 45° C. The gelatin solution (0.35 mL) was cast onto the paraffin sphere assembly. The gelatin/paraffin composite was transferred into a freezer at −76° C. to induce phase separation. The composite was in the freezer for at least 4 hours. The gelatin/paraffin composite was then soaked in 50 mL −18° C. cold ethanol for 24 hours. The composite was then transferred into 50 mL 1,4-dioxane for solvent exchange for 24 hours with fresh 1,4-dioxane replaced every 8 hours.

The composite was then kept in a freezer at −18° C. for about 12 hours to ensure freezing. The frozen composite was freeze-dried in a salt-ice bath for 4 days followed by vacuum drying at room temperature for 3 additional days. The gelatin/paraffin composite was cut to samples with a thickness of 2.0 mm, and soaked in 50 mL hexane to leach out the paraffin spheres. The hexane was changed every 12 hours at least 6 times. To accelerate the dissolution of paraffin spheres, the dissolution process was carried out in an oven at 37° C.

Cyclohexane was then used for solvent exchange. The gelatin scaffold was frozen at −18° C. for 12 hours and was freeze-dried at between −10° C. and −5° C. in a salt-ice bath for 4 days followed by vacuum drying at room temperature for 3 additional days.

Figure 13A:
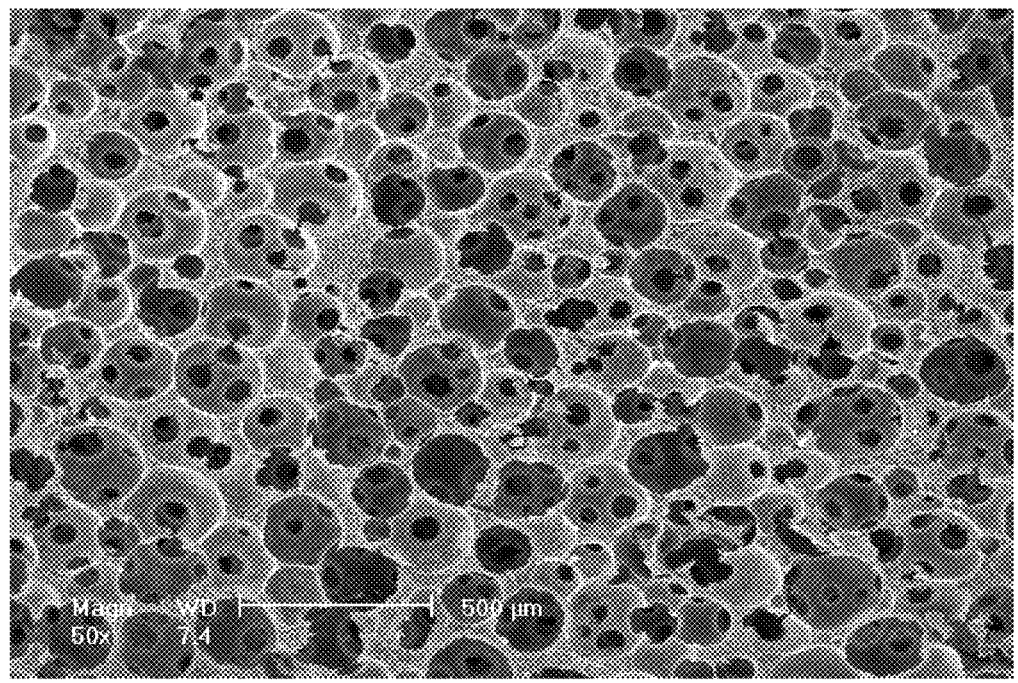
FIGS. 13A through 13E depict SEM micrographs of: a nano-fibrous gelatin scaffold at 50× magnification (FIG. 13A), a pore-wall structure of the nano-fibrous gelatin scaffold of FIG. 11A at 1000× magnification (FIG. 13B), the pore-wall structure of FIG. 13B at 20,000× magnification (FIG. 13C), a GELFOAM® scaffold at 50× magnification (FIG. 13D), and a pore-wall structure of the GELFOAM® structure of FIG. 13D at 1000× magnification (FIG. 13E)
Figure 13B:
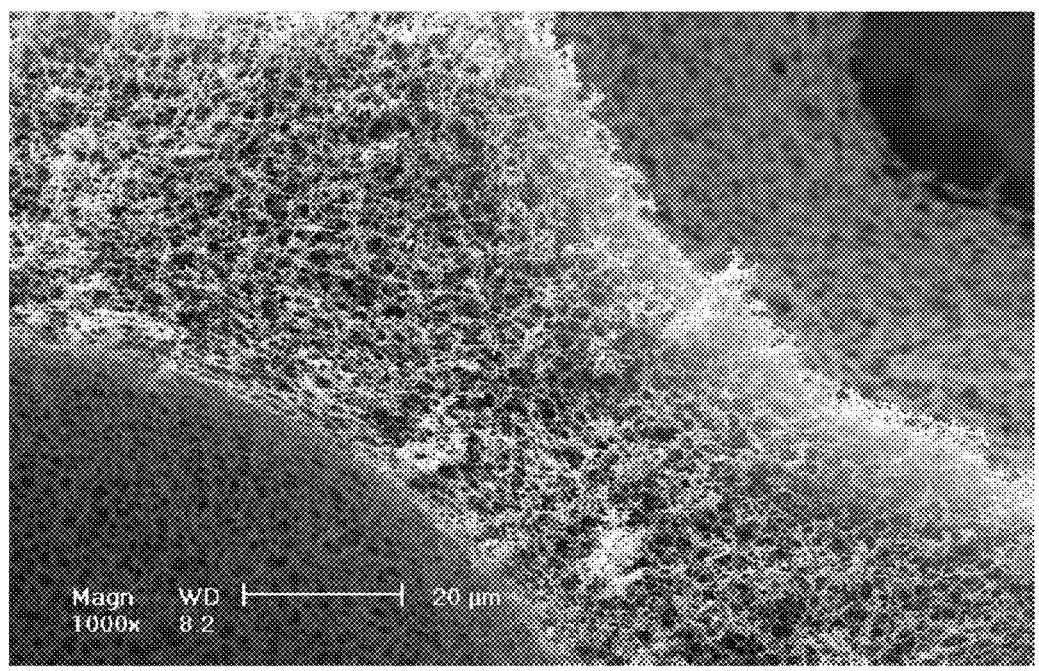
Figure 13C:
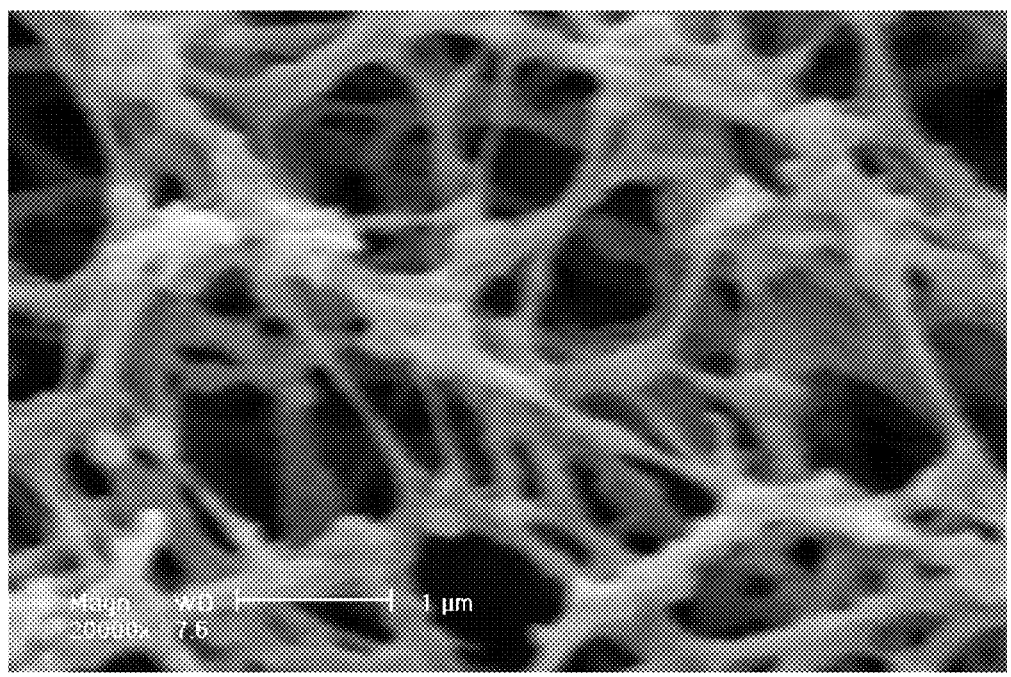

The gelatin scaffold shown in FIGS. 13A through 13C were not cross-linked. In some instances, however, it may be desirable to cross-link the scaffold using, e.g., ethyl-3-(3-dimethylaminopropyl) carbodiimide HCl (EDC) and N-hydroxy-succinimide (NHS) in a {2-[N-morpholino]ethane-sulfonic acid}hydrate MES buffer (pH 5.3, 0.05 M). Generally, cross-linked and non-cross-linked samples (in this example) are relatively similar in morphology unless they are immersed in water or another solvent for gelatin.

To maintain the microstructure of the gelatin matrices and prevent the swelling of the gelatin matrices in water, a 90/10 (v/v) dioxane/water (or 90/10 (v/v) acetone/water) solvent mixture was chosen instead of water. The scaffold was washed using distilled water at 37° C. 3 times, and was then frozen at −18° C. for at least 12 hours. The scaffold was freeze-dried for 4 days and then vacuum dried at room temperature for 3 days. The dried gelatin scaffold was stored in a desiccator for later use.

The surface morphology of the scaffolds (both nano-fibrous gelatin and a comparative GELFOAM® scaffold) was examined using SEM (Philips XL30 FEG). The scaffolds were coated with gold using a sputter coater (DeskII, Denton vacuum Inc). During the process of gold coating, the gas pressure was kept at 50 mtorr, and the current was 40 mA. The coating time was about 200 seconds. Samples were analyzed at 10 kV.

The surface area was measured by $N_2$ adsorption experiments at liquid nitrogen temperature on a Belsorp-Mini (Bel Japan, Osaka, Japan), after evacuating samples at 25° C. for 10 h (<7×10-3 Torr).

Porosity $\epsilon$ was calculated as: $\epsilon = 1 - D_p/D_0$, where $D_p$ is the skeletal density of gelatin foam, and $D_0$ is the density of gelatin. $D_p$ was determined by:

$$D_p = (4m)/(\pi d^2 h),$$

where m was the mass, d was the diameter, and h was the thickness of the scaffold. For the gelatin used (Type B: from calf skin, Approx. 225 Bloom), $D_0 = 1.35$ g/cm$^3$.

Figure 13D:
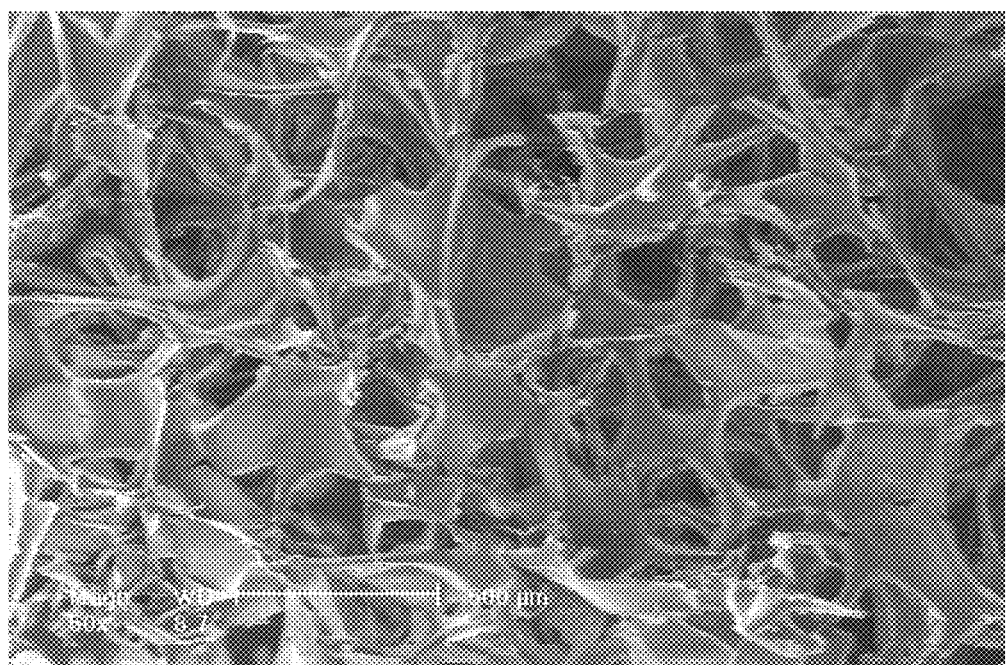
Figure 13E:
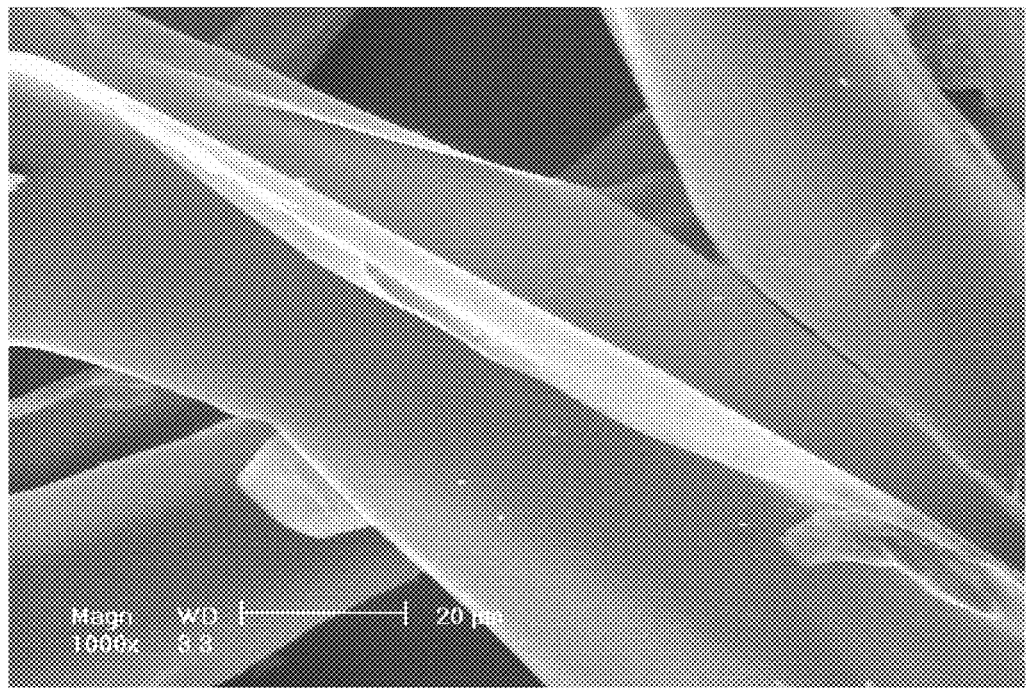

The nano-fibrous gelatin scaffold formed herein (see FIGS. 13A-13C) had a much higher surface area compared to gelatin scaffolds with smooth pore surfaces (solid-walled gelatin scaffolds), such as GELFOAM® (see FIGS. 13D and 13E), which is commercially available from Pharmacia & Upjohn Co. in Kalamazoo, Mich. The surface area of the nano-fibrous gelatin scaffold was more than 30.0 m$^2$/g while the surface area of GELFOAM® was less than 0.1 m$^2$/g. The high surface area of the nano-fibrous structure is believed to enhance protein adsorption and thus may be beneficial to cell adhesion.

In tissue engineering, a basic requirement for a scaffold is that the scaffold should have adequate mechanical stability to maintain the spaces required for cell in-growth and matrix production before neo-tissue formation. GELFOAM®, a highly porous gelatin sponge, has relatively poor mechanical properties (e.g., shrinkage and a low compressive modulus of 80±8 kPa), and thus has a limited application for bone tissue engineering. In contrast, the nano-fibrous gelatin scaffold with well-defined spherical pores is believed to provide good mechanical support for cell growth. The compressive modulus of the nano-fibrous gelatin scaffold was 801±108 kPa when the gelatin concentration was 15.0% (wt/v). This scaffold also has a high porosity of 96.04±0.16%.

Thawed MC3T3-E1 osteoblasts (clone 26) were cultured in ascorbic acid-free $\alpha$-MEM supplemented with 10% fetal calf serum (FBS), 100 U/mL penicillin and 100 μg/mL streptomycin in a humidified incubator at 37° C. with 5% $CO_2$. The medium was changed every other day and passaged at confluence. The nano-fibrous gelatin and GELFOAM® scaffolds were sterilized with ethylene oxide for 24 hours. The scaffolds were soaked in PBS under vacuum for 1 hour. Afterwards, the scaffolds were washed with a complete medium ($\alpha$-MEM, 10% FBS, 100 U/mL penicillin and 100 μg/mL streptomycin) twice (2 hours each time) on an orbital shaker (3520, Lab-Line Instruments, INC), and 5×10$^5$ cells suspended in 200 μl of medium were seeded on each scaffold. The medium was changed every 12 hours while in the Teflon seeding trays. After 48 hours, cell-scaffold constructs were removed from the Teflon seeding trays, and transferred into 6-well tissue culture plates containing 3 mL of complete medium. The constructs were cultured on the orbital shaker at 100 rpm in the humidified incubator at 37° C. with 5% $CO_2$. After 7 days, the complete medium was supplemented with 50 mg/mL ascorbic acid and 10 mm $\beta$-glycerol phosphate. The medium was changed every other day.

After cultured in vitro for varying time intervals, the cell-scaffold constructs were fixed in 10% neutral-buffered formalin and dehydrated through an ethanol gradient, and embedded in paraffin. Paraffin-embedded disk specimens were cut into 5-μm cross sections and stained with hematoxylin and eosin (H&E) for histologic analysis.

Figure 14A:
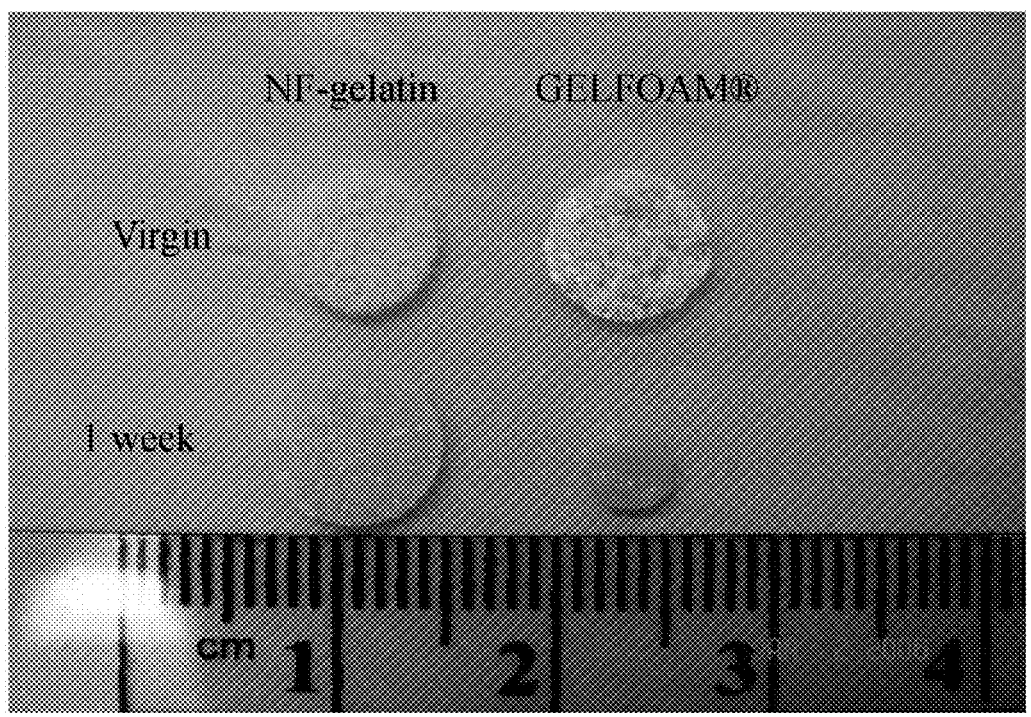
FIGS. 14A through 14C depict an evaluation of scaffold/cell constructs, where
Figure 14B:
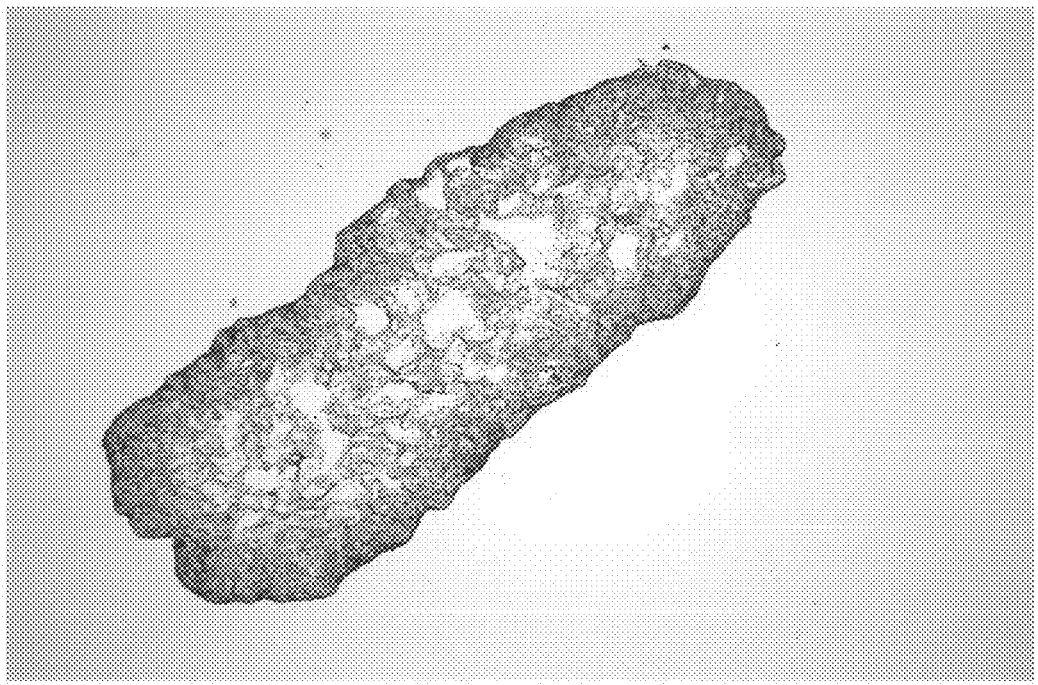
Figure 14C:
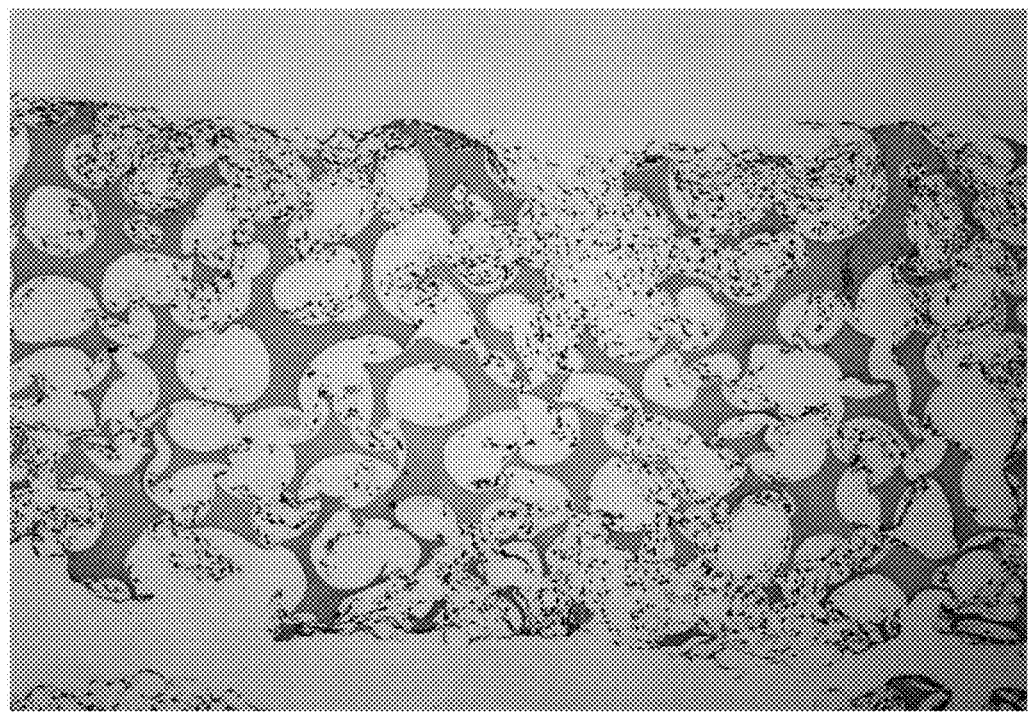
Figure 14D:
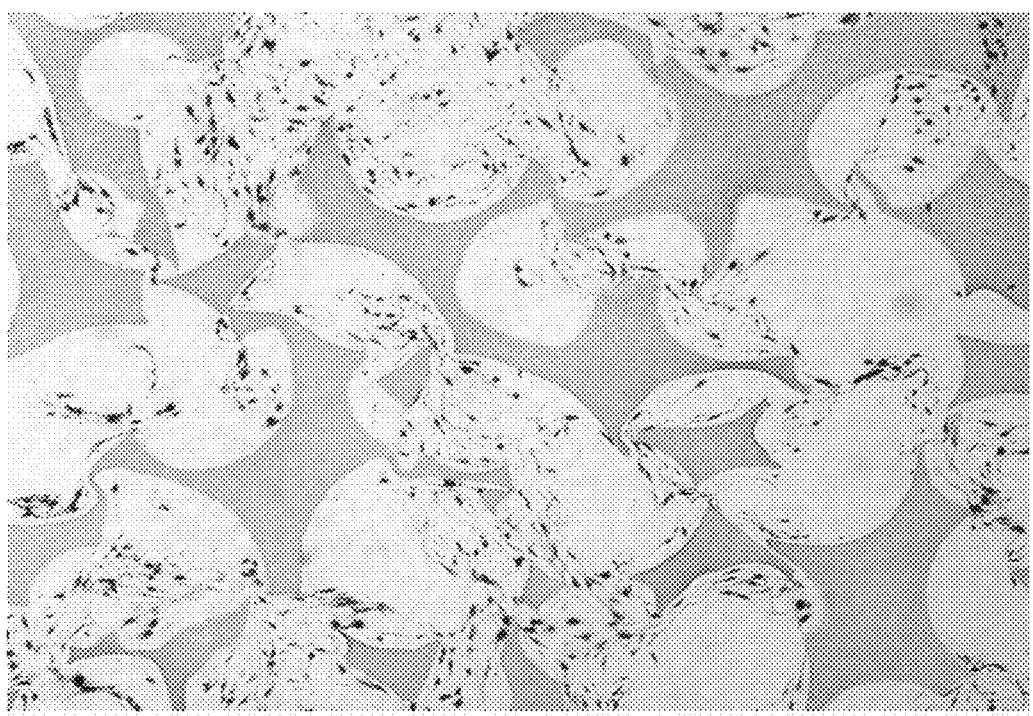
FIG. 14D is a microscopic observation of an H&E stained nano-fibrous gelatin scaffold after culturing MC3T3-E1 osteoblasts for 2 weeks (10× magnification)

After one week of MC3T3-E1 pre-osteoblast cell culture on GELFOAM® and the nano-fibrous gelatin scaffold of the same original size, the diameter of cell/GELFOAM® construct shrank to approximately half of its original value, while the cell/nano-fibrous gelatin scaffold construct maintained its size (see FIG. 14A). Cell distribution and neo-tissue formation in the scaffolds were examined histologically. After 2 weeks, cells were distributed throughout the entirety of both the GELFOAM® and nano-fibrous gelatin scaffolds (FIGS. 14B-14D). However, the cell mass was denser in the areas close to the surface compared to the center of the GELFOAM® scaffold. Due to its shrinkage, a dense layer of cell and matrix formed on the outer region of the GELFOAM® scaffold. It is believed that this layer of cells could suffer from nutrition limitations and could severely obstruct the diffusion of nutrients to the center, thereby endangering cellular survival in the central area. In contrast, the outer pores of the nano-fibrous gelatin scaffold were still open after 2 weeks of cell culture, and cells were substantially uniformly distributed throughout the entire scaffold. The uniform cell distribution throughout the scaffold was attributed to its dimensional stability to maintain the well-defined interconnected pore structure, which also facilitates the diffusion of nutrients into and metabolic waste out of the cell/scaffold construct.

Example 24

Incubation of Nano-Fibrous Gelatin Scaffold in Simulated Body Fluid

The simulated body fluid (SBF) was prepared as described in Zhang et al., *Journal of Biomedical Material Research*, 1999, 45, 285. Three nano-fibrous gelatin scaffolds (7.2 mm in diameter and 2 mm in thickness) formed in Example 23 were immersed in 100 mL SBF in a glass bottle maintained at 37° C. The SBF was changed every 24 hours. After being incubated for various periods of time, the scaffolds were removed from the fluid and immersed in 400 mL deionized water overnight to remove the soluble inorganic ions.

Figure 15A:
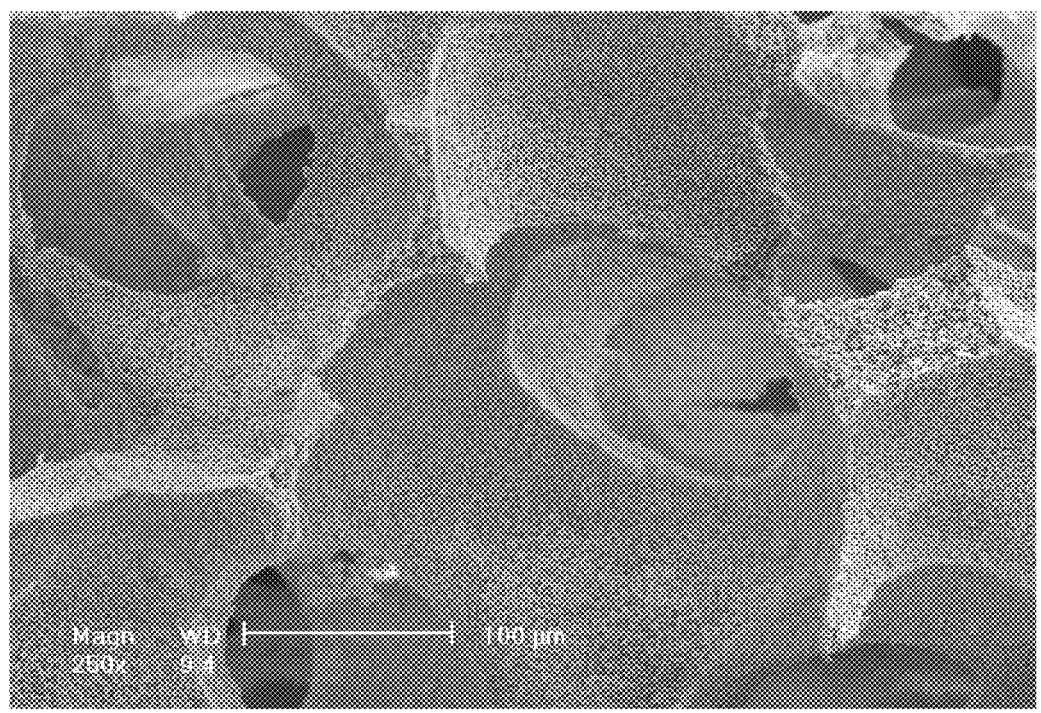
Figure 15B:
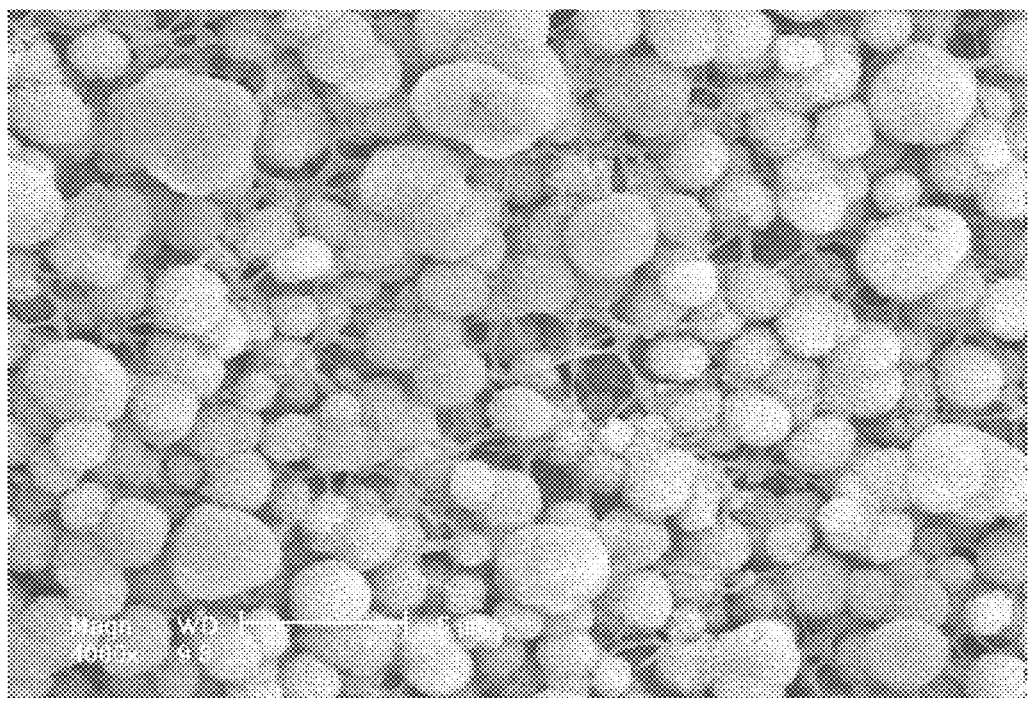
Figure 15C:
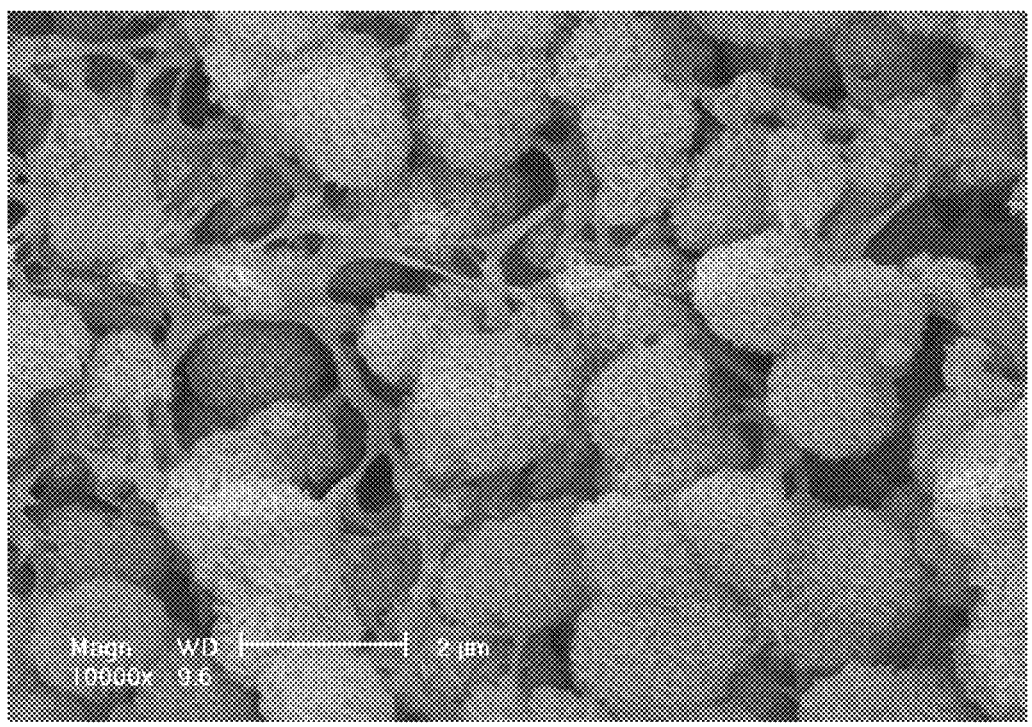

After 3 days of incubation, scattered and very small particles were observed on the surface of the nano-fibrous gelatin pore walls. After 1 week, a large number of apatite micro particles (aggregates of nano-sized needles and flakes) with an average diameter of about 2 μm were formed on the surface of the pore walls throughout the nano-fibrous gelatin scaffold (see FIGS. 15A through 15C). It is believed that the particle number and size in the scaffold were controlled by the incubation time and ionic concentration of the SBF. Generally, the average particle number and size increased with incubation time.

The compressive modulus of the scaffold was measured using an MTS Synergie 200 mechanical tester (MTS Systems Corporation, Eden Prairie, Minn.). All samples were circular discs (16 mm in diameter and 2 mm in thickness). Six specimens were tested for each sample. The averages and standard deviations were reported. The compressive modulus had a slight increase after the nano-fibrous gelatin scaffold was incubated in SBF for 3 days. After 7 days, the compressive modulus (1408±315 kPa) was significantly higher than that of the initial nano-fibrous gelatin scaffold (801±108 kPa). As such, it is believed that the compressive modulus of the nano-fibrous gelatin/apatite composite scaffold could further increase with incubation time. However, with longer incubation times, the composite scaffold surfaces would be entirely covered with a thick layer of apatite, which may or may not be desirable depending, at least in part, on the specific application.

Example 25

Cell Expansion and Cell Seeding and Culture on Nano-Fibrous Gelatin Scaffold of Example 23 and Nano-Fibrous Gelatin/Apatite Composite Scaffold of Example 24

MC3T3-E1 pre-osteoblast cells were seeded onto both nano-fibrous gelatin scaffolds (see Example 23) and nano-fibrous gelatin/apatite scaffolds (see Example 24) and cultured in vitro for 4 weeks.

Thawed MC3T3-E1 osteoblasts (clone 26) were cultured in ascorbic acid-free α-MEM supplemented with 10% fetal calf serum (FBS), 100 U/mL penicillin and 100 μg/mL streptomycin in a humidified incubator at 37° C. with 5% $CO_2$. The medium was changed every other day and passaged at confluence. The nano-fibrous gelatin and nano-fibrous gelatin/apatite composite scaffolds were sterilized with ethylene oxide for 24 hours. The scaffolds were soaked in PBS under vacuum for 1 hour. Afterwards, the scaffolds were washed with a complete medium (α-MEM, 10% FBS, 100 U/mL penicillin and 100 μg/mL streptomycin) twice (2 hours each time) on an orbital shaker (3520, Lab-Line Instruments, INC), and $5\times10^5$ cells suspended in 200 μl of medium were seeded on each scaffold. The medium was changed every 12 hours while in the Teflon seeding trays. After 48 hours, cell-scaffold constructs were removed from the Teflon seeding trays, and transferred into 6-well tissue culture plates containing 3 mL of complete medium. The constructs were cultured on the orbital shaker at 100 rpm in the humidified incubator at 37° C. with 5% $CO_2$. After 7 days, the complete medium was supplemented with 50 mg/mL ascorbic acid and 10 mm β-glycerol phosphate. The medium was changed every other day.

Bone sialoprotein (BSP) and osteocalcin (OCN), two well-known late osteogenic differentiation markers, were used to examine osteoblastic cell differentiation. Transcriptional expression of BSP and OCN was quantified using real-time RT-PCR.

Total RNA was isolated using an RNeasy Mini Kit (Qiagen) with Rnase-Free DNase set (Qiagen, Valencia, Calif.) according to the manufacturer's protocol after the scaffolds were mechanically homogenized with a Tissue-Tearor. The cDNA was made using a Geneamp PCR (Applied Biosystems, Foster City, Calif.) with TaqMan (Applied Biosystems) reverse transcription reagents and 10 minutes incubation at 25° C., 30 minutes reverse transcription at 48° C., and 5 minutes inactivation at 95° C. Real-time PCR was set up using TaqMan Universal PCR Master mix and specific primer sequences for OCN (5'-CCGGGAGCAGTGTGAGCTTA-3' (SEQ ID NO 1) and 5'-TAGATGCGTTTGTAGGCGGTC-3' (SEQ ID NO 2)), and BSP (5'-CAGAGGAGGCAAGCGT-CACT-3' (SEQ ID NO 3) and 5'-CTGTCTGGGTGCCAA-CACTG-3' (SEQ ID NO 4)), with 2 minutes incubation at 50° C., 10 min Taq Activation at 95° C., and 50 cycles of denaturation for 15 seconds at 95° C. followed by an extension for 1 minute at 72° C. on an ABI Prism 7500 Real-Time PCR System (Applied Biosystems). Target genes were normalized against Beta Actin (Applied Biosystems) within the linear range of amplification.

Figure 16:
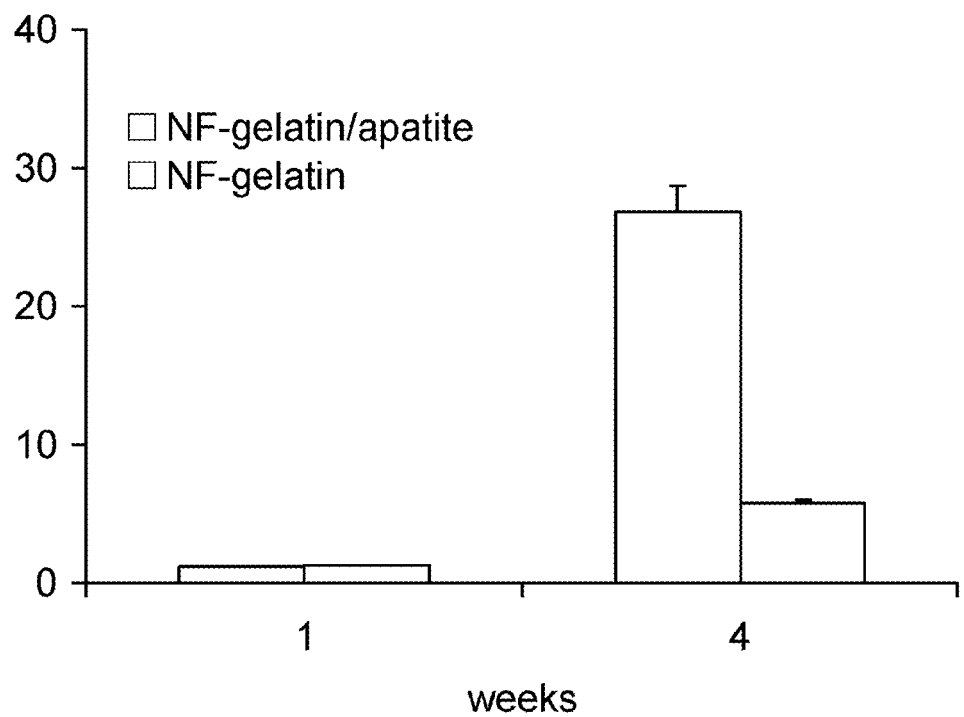
FIGS. 16 and 17 are graphs depicting the quantitative RT-PCR results of bone sialoprotein (BSP, FIG. 16) and osteocalcin (OCN, FIG. 17) gene expression (where the Y-axis is the gene expression results normalized by beta actin), MC3T3-E1 cells were cultured on nano-fibrous gelatin and nano-fibrous gelatin/apatite scaffolds for 1 and 4 weeks, the nano-fibrous gelatin/apatite composite scaffold was obtained by immersing nano-fibrous gelatin scaffolds in 1.5×SBF for 7 days, the culture media: α-MEM supplemented with 10% FBS and 1% antibiotic/antimycotic, 10 mM β-glycerol phosphate and 50 µg/ml ascorbic acid, data are means±standard deviations from 3 to 4 specimens, (*) represents statistically significant differences ($p<0.05$)
Figure 17:
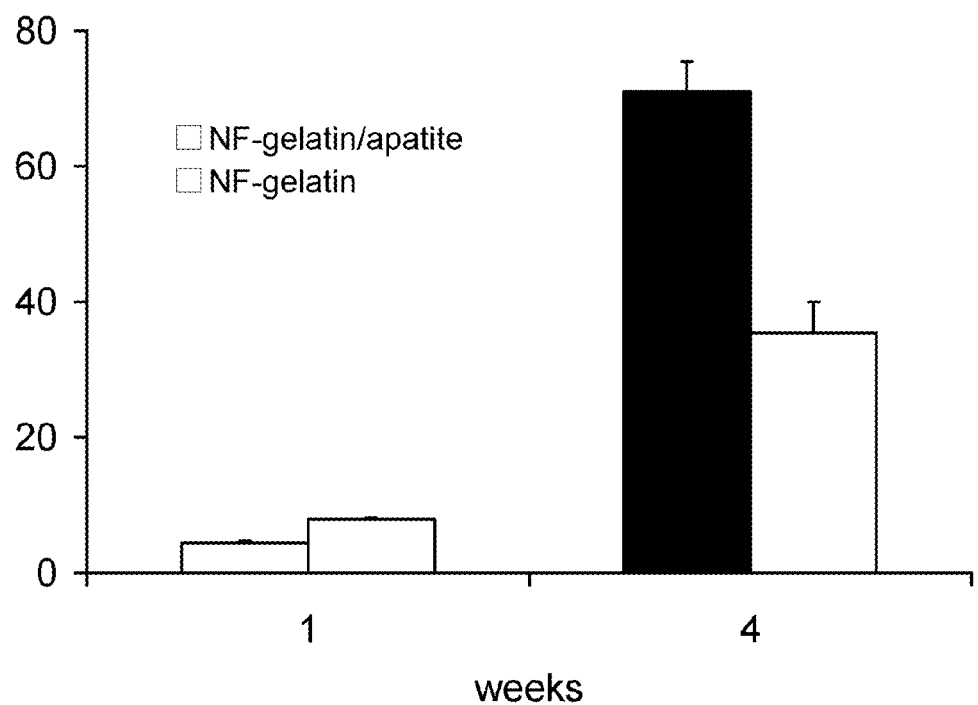

After 1 week cell culture, the expression of BSP and OCN in both the nano-fibrous gelatin/apatite/osteoblast constructs and nano-fibrous gelatin/osteoblast constructs was low. This is consistent with the fact that BSP and OCN are late osteogenic differentiation markers (see FIGS. 16 and 17). After 4 weeks of cell culture, the expression of BSP in the nano-fibrous gelatin/apatite/osteoblast constructs was about 5 times higher than in the nano-fibrous gelatin/osteoblast constructs, while the expression of OCN in the nano-fibrous gelatin/apatite/osteoblast constructs was approximately 2 times higher than in the nano-fibrous gelatin/osteoblast constructs. These results indicate that the incorporated apatite in the composite scaffold enhances the osteogenic differentiation.

Example 26

Preparation of Nano-Fibrous Gelatin/Inorganic Material Composite Scaffolds Via Phase Separation Gelatin/Calcium Carbonate Scaffolds: Paraffin spheres (0.35 g, diameter range: 250-425 μm) were added to Teflon molds (cylindrical vials with a diameter of 18 mm), and the top surface was leveled. The molds were then preheated at 37° C. for about 20 minutes to ensure that the paraffin spheres were adhered to each other. 2.0 g of gelatin were dissolved in a mixture containing 8 mL water and 8 mL ethanol at 50° C. About 0.20 g of calcium carbonate ($CaCO_3$) powder was added to gelatin solution with stirring. About 0.30 mL of the gelatin/$CaCO_3$ suspension was cast onto the paraffin sphere assembly. The gelatin/CaCO$_3$/paraffin composite was transferred into a freezer at −76° C. to induce phase separation for 4 hours.

The gelatin/CaCO$_3$/paraffin composite was then soaked in 50 mL cold ethanol (−18° C.) for about 24 hours. The composite was then transferred into 50 mL of 1,4-dioxane for solvent exchange for 24 hours, with fresh 1,4-dioxane replaced every 8 hours. The composite was then kept in a freezer at −18° C. for 12 hours. The frozen composite was freeze-dried in an ice bath for 2 days followed by vacuum drying at room temperature for 4 days.

The gelatin/CaCO$_3$/paraffin composite was cut into discs with 2.0 mm thickness. The composite was soaked in 50 mL hexane to leach out the paraffin spheres. The hexane was changed every 12 hours, at least 6 times. To accelerate the dissolution of paraffin spheres, the process may be carried out in an oven at about 37° C. Cyclohexane was used for solvent exchange. The gelatin/CaCO$_3$ scaffold was frozen at −18° C. for 12 hours and freeze-dried in an ice bath for 2 days followed by vacuum drying at room temperature for 4 days.

Gelatin/Hydroxyapatite Scaffolds: Paraffin spheres (0.35 g, diameter range: 250-425 μm) were added to Teflon molds (cylindrical vials with a diameter of 18 mm), and the top surface was leveled. The molds were then preheated at 37° C. for 20 min to ensure that the paraffin spheres were adhered to each other. 1.6 g of gelatin was dissolved in a mixture containing 8 mL water and 8 mL ethanol at 50° C. About 0.16 g of hydroxyapatite (HAP) powder was added to the gelatin solution with stirring. About 0.30 mL of the gelatin/HAP mixture was cast onto paraffin sphere assembly. The gelatin/HAP/paraffin composite was transferred into a freezer at −76° C. to induce phase separation for 4 hours.

The gelatin/HAP/paraffin composite was then soaked in 50 mL cold ethanol (−18° C.) for about 24 hours. The composite was then transferred into 50 mL of 1,4-dioxane for solvent exchange for 24 hours, with fresh 1,4-dioxane replaced about every 8 hours. The composite was then kept in a freezer at −18° C. for 12 hours. The frozen composite was freeze-dried in an ice bath for 2 days followed by vacuum drying at room temperature for 4 days.

The gelatin/HAP/paraffin composite was cut to discs with 2.0 mm thickness. The composite was soaked in 50 mL hexane to leach out the paraffin spheres. The hexane was changed every 12 hours, for 6 times. As previously mentioned, to accelerate the dissolution of the paraffin spheres, the process can be carried out in an oven at 37° C. Cyclohexane was used for solvent exchange, and the gelatin/HAP scaffold was frozen at −18° C. for 12 hours and freeze-dried in an ice bath for 2 days followed by vacuum drying at room temperature for 4 days.

SEM Observation of the Gelatin/Hydroxyapatite Scaffolds of Example 26. The surface morphology of the gelatin/HAP scaffolds was observed using scanning electronic microscopy (Philips XL30 FEG). The scaffolds were coated with gold using a sputter coater (DeskII, Denton vacuum Inc). During the process of gold coating, the gas pressure was maintained at 50 mtorr and the current was maintained at 40 mA. The coating time was 120 seconds. Samples were analyzed at 10 kV.

Figure 18A:
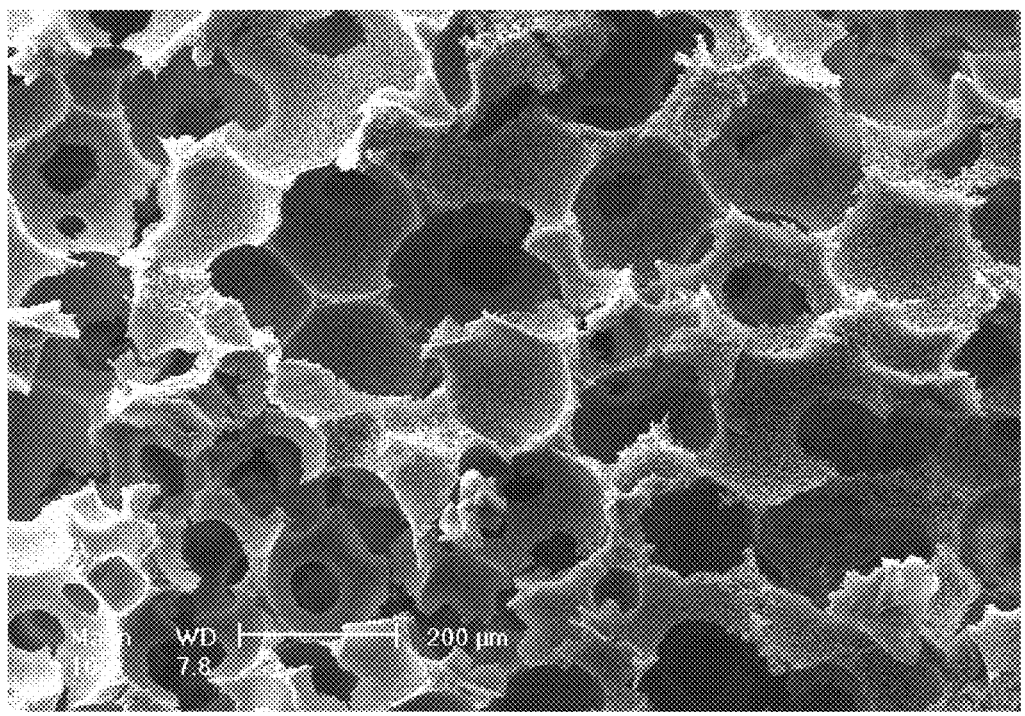
FIGS. 18A and 18B are SEM micrographs of nano-fibrous gelatin/hydroxyapatite composite scaffolds at 100× magnification (FIG. 18A) and at 1000× magnification (FIG. 18B).
Figure 18B:
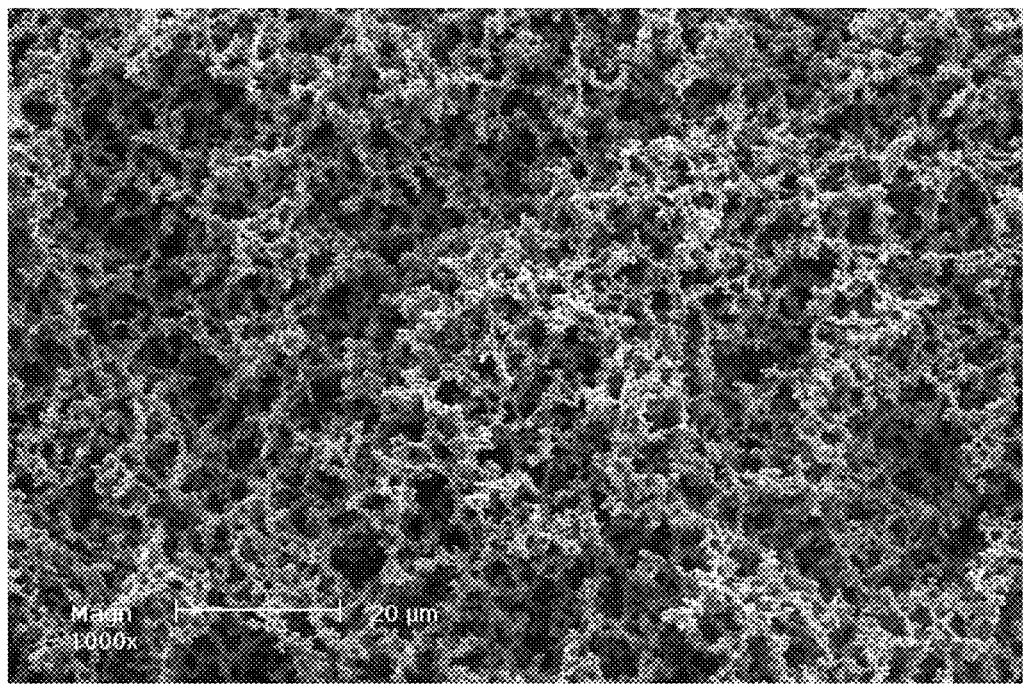

The three-dimensional porous gelatin/HAP composite scaffold is shown in FIGS. 18A and 18B. In particular, the pore size of the scaffold (ranging from 250 μm to 420 μm) is depicted in FIG. 18A, and the nano-fibers (fiber diameter ranging from 50 mm to 500 mm) of one of the porous walls is depicted in FIG. 18B. The length of fibers ranges from several hundred nanometers to several micrometers.

While several embodiments have been described in detail, it will be apparent to those skilled in the art that the disclosed embodiments may be modified. Therefore, the foregoing description is to be considered exemplary rather than limiting.

What is claimed is:

1. A method of modifying porous materials having interconnected, three-dimensional surfaces defined on macro structures, the method comprising the step of: stabilizing the porous materials by crosslinking the three-dimensional surfaces; wherein the porous materials are the macro structures which include nano-fibrous walls with a fiber diameter ranging from about 50 nm to about 500 nm and pores having a controlled design as a result of thermally induced phase separation and porogen leaching and wherein the porous materials have at least one of: substantial stability in a predetermined environment; predetermined physical properties; predetermined biological properties; and predetermined surfaces.

2. The method as defined in claim 1, further comprising varying the crosslinking density in a manner sufficient to achieve the predetermined physical properties.

3. The method as defined in claim 2 wherein the predetermined physical properties include at least one of mechanical properties, surface properties, swelling properties, and combinations thereof.

4. The method as defined in claim 1, further comprising varying the crosslinking density in a manner sufficient to achieve the predetermined biological properties.

5. The method as defined in claim 1, further comprising depositing a coating layer on the porous materials, wherein the coating layer ranges in thickness between about $10^{-10}$ meters and about $10^{-3}$ meters.

6. The method as defined in claim 5 wherein the coating layer ranges in thickness between about $10^{-9}$ meters and about $10^{-6}$ meters.

7. The method as defined in claim 1 wherein the crosslinking is achieved via at least one of covalent bond formation and ionic bond formation.

8. The method as defined in claim 1 wherein the porous materials comprise at least one of synthetic macromolecules; natural macromolecules; substantially non-macromolecular materials; natural macromolecule-containing materials; synthetic macromolecule-containing materials; oligomeric materials; fragments of macromolecules; macromolecule-containing composites; and mixtures thereof.

9. The method as defined in claim 8 wherein the macromolecule-containing composite has as a component thereof at least one of ceramic materials, metal materials, inert additives, active additives, and mixtures thereof.

10. The method as defined in claim 8 wherein the natural macromolecules comprise at least one of proteins; carbohydrates; lipids; derivatives thereof; denatured forms thereof; modified forms thereof; fragments thereof; and mixtures thereof.

11. The method as defined in claim 8 wherein the synthetic macromolecules are polymeric materials, and wherein the method further comprises the step of synthesizing the polymeric materials in situ.

12. The method as defined in claim 1 wherein the porous materials comprise gelatin materials.

13. The method as defined in claim 12 wherein the gelatin materials are formed by:
   dissolving gelatin in a solvent or solvent mixture to form a gelatin solution;
   freezing the gelatin solution for a predetermined time to form a gelatin gel;
   exposing the gelatin gel to solvent exchange; and
   freeze-drying the solvent exchanged gelatin gel.

14. The method as defined in claim 13 wherein the gelatin materials have at least one of a nano-fibrous structure; a nano-fibrous structure with pores ranging between about micro-sized and about macro-sized; and combinations thereof.

15. The method as defined in claim 14, further comprising altering the structure of the gelatin materials by selecting a predetermined solvent mixture.

16. The method as defined in claim 1, further comprising incorporating, in situ, an inorganic material onto or into the porous materials, wherein the porous materials comprise a gelatin scaffold.

17. The method as defined in claim 16 wherein prior to incorporating the inorganic material, the method further comprises supplying a preformed gelatin scaffold.

18. The method as defined in claim 16 wherein incorporating the inorganic material onto the gelatin scaffold is accomplished via a simulated body fluid technique.

19. The method as defined in claim 18 wherein the simulated body fluid technique includes immersing the gelatin scaffold in a liquid reagent for a predetermined time and at a predetermined temperature.

20. The method as defined in claim 16 wherein prior to incorporating the inorganic material, the method further comprises carrying out the crosslinking of the porous materials comprising the gelatin scaffold using ethyl-3-(3-dimethylaminopropyl) carbodiimide HCl and N-hydroxy-succinimide.

21. The method as defined in claim 16 wherein incorporating the inorganic material into the gelatin scaffold is accomplished by:
   forming a mixture of gelatin and the inorganic material;
   casting the mixture onto a porogen;
   inducing phase separation of the mixture; and
   removing the porogen, thereby forming a gelatin/inorganic material composite scaffold.

22. The method as defined in claim 16 wherein the inorganic material is selected from hydroxyapatite, calcium carbonate, calcium phosphate, beta-TCP, bioglass, calcium sulfate, oxides, or combinations thereof.

23. Porous materials, comprising:
macro structures including:
nano-fibrous walls with a fiber diameter ranging from about 50 nm to about 500 nm; and
pores having a controlled design as a result of thermally induced phase separation and porogen leaching; and
interconnected, three-dimensional surfaces defined on the macro structures;
wherein the three-dimensional surfaces are crosslinked;
and wherein the porous materials have at least one of: substantial stability in a predetermined environment; predetermined physical properties; predetermined biological properties; and predetermined surfaces.

24. The porous materials as defined in claim 23 wherein the crosslinked surface has a crosslinking density sufficient to achieve the at least one of predetermined physical properties and biological properties.

25. The porous materials as defined in claim 23 wherein the porous materials comprise at least one of synthetic macromolecules; natural macromolecules; substantially non-macromolecular materials; natural macromolecule-containing materials; synthetic macromolecule-containing materials; oligomeric materials; fragments of macromolecules; macromolecule-containing composites; and mixtures thereof.

26. The porous materials as defined in claim 25 wherein the macromolecule-containing composite has as a component thereof at least one of ceramic materials, metal materials, inert additives, active additives, and mixtures thereof.

27. The porous materials as defined in claim 25 wherein the natural macromolecules comprise at least one of proteins; carbohydrates; lipids; derivatives thereof; denatured forms thereof; modified forms thereof; fragments thereof; and mixtures thereof.

28. The porous materials as defined in claim 23 wherein the porous materials comprise: a gelatin scaffold; and wherein the porous materials include an inorganic material incorporated onto or into the gelatin scaffold.

29. The porous material as defined in claim 28 wherein the inorganic material is selected from hydroxyapatite, calcium carbonate, calcium phosphate, beta-TCP, bioglass, calcium sulfate, oxides, or combinations thereof.

30. The porous material as defined in claim 23 wherein the macro structures are formed of gelatin and wherein the porous material further comprises an inorganic material incorporated onto the macro structures.

31. The porous material as defined in claim 30 wherein the inorganic material is selected from hydroxyapatite, calcium carbonate, calcium phosphate, beta-TCP, bioglass, calcium sulfate, oxides, or combinations thereof.

32. The porous material as defined in claim 23, further comprising a coating applied to the macro structures.

33. The porous material as defined in claim 23 formed by the process of:
generating a solution of a material in a solvent mixture including water and any of ethanol or methanol;
casting the solution onto a sphere assembly to form a composite;
freezing the composite to induce phase separation;
soaking the composite in an alcohol at a predetermined temperature;
performing a solvent exchange to replace the alcohol with 1,4-dioxane;
freeze-drying the composite; and
leaching out the sphere assembly.

34. The porous material as defined in claim 23 wherein the macro structures are formed of gelatin.

35. The porous material as defined in claim 23 wherein the pores having the controlled design are formed using porogen spheres having a size ranging from 250 μm to 420 μm.

36. The porous materials as defined in claim 23 wherein the macro structures are formed of gelatin and wherein the porous material further comprises an inorganic material incorporated into the macro structures.

* * * * *

SEQUENCE LISTING

```
<160> NUMBER OF SEQ ID NOS: 4

<210> SEQ ID NO 1
<211> LENGTH: 20
<212> TYPE: DNA
<213> ORGANISM: Artificial Sequence
<220> FEATURE:
<223> OTHER INFORMATION: OTHER INFORMATION: Synthetic

<400> SEQUENCE: 1
ccgggagcag tgtgagctta                                                 20

<210> SEQ ID NO 2
<211> LENGTH: 21
<212> TYPE: DNA
<213> ORGANISM: Artificial Sequence
<220> FEATURE:
<223> OTHER INFORMATION: Synthetic

<400> SEQUENCE: 2
tagatgcgtt tgtaggcggt c                                               21

<210> SEQ ID NO 3
<211> LENGTH: 20
<212> TYPE: DNA
<213> ORGANISM: Artificial Sequence
<220> FEATURE:
<223> OTHER INFORMATION: Synthetic
```

```
<400> SEQUENCE: 3
cagaggaggc aagcgtcact                                                    20

<210> SEQ ID NO 4
<211> LENGTH: 20
<212> TYPE: DNA
<213> ORGANISM: Artificial Sequence
<220> FEATURE:
<223> OTHER INFORMATION: Synthetic

<400> SEQUENCE: 4
ctgtctgggt gccaacactg                                                    20
```